United States Patent [19]
Dong et al.

[11] Patent Number: 5,424,942
[45] Date of Patent: Jun. 13, 1995

[54] EXTENDED HORIZON ADAPTIVE BLOCK PREDICTIVE CONTROLLER WITH AN EFFICIENT PREDICTION SYSTEM

[75] Inventors: Yang Dong; Howard J. Chizeck, both of Cleveland Heights; James M. Khoury, Strongsville; Robert N. Schmidt, Cleveland, all of Ohio

[73] Assignee: Orbital Research Inc., Cleveland Hts., Ohio

[21] Appl. No.: 104,882

[22] Filed: Aug. 10, 1993

[51] Int. Cl.$^6$ .................. G05B 13/02; G05B 13/04
[52] U.S. Cl. .................................. 364/164; 364/165; 364/149
[58] Field of Search ................ 364/148–160, 364/164, 165

[56] References Cited

U.S. PATENT DOCUMENTS

| | | | |
|---|---|---|---|
| 4,358,822 | 11/1982 | Sanchez | 364/151 |
| 5,301,101 | 4/1994 | MacArthur et al. | 364/156 |

OTHER PUBLICATIONS

Box et al., *Time Series Analysis, Forecasting and Control*, 1970 pp. 7–11.
Industrial Computer Source, *Source-Book*, 1993, pp. 47 and 51.
Texas Instruments, *TM5320C3x User's Guide*, 1992, pp. 2-1 to 2-10.
Astrom et al., *Computer Controlled Systems: Theory and Design*, 1984 pp. 288–290.
Astrom et al., *On Self Tuning Regulators*, 1973 pp. 185–199.
Astrom et al., *Adaptive Control*, 1989 pp. 198–208.
Borisson, *Self-Tuning Regulators for a Class of Multivariable Systems*, 1979 Automatica, vol. 15, pp. 209–215.
Clarke, *Self-Tuning Control of Non-Minimum Phase Systems*, No. 5, 1984 pp. 501–516.
Clarke et al., *Generalized Predictive Control–Part I and II*, pp. 137–160 1987.
Cutler et al., *Dynamic Matrix Control—A Computer Control Algorithm*, 1980.
Dong, *Extended Horizon Predictive Control*, 1992, Case Western Reserve University, abstract and pp. 52–93.
Dong et al, *A Horizon-Recursive Form for Predictors and Their Computation*, 1990, 29th IEEE Conference on Decision and Control, Honolulu, Hawaii, pp. 1481–1486.

(List continued on next page.)

*Primary Examiner*—Roy N. Envall, Jr.
*Assistant Examiner*—Steven R. Garland
*Attorney, Agent, or Firm*—Fay, Sharpe, Beall, Fagan, Minnich & McKee

[57] ABSTRACT

An extended horizon adaptive block predictive controller includes a block control system and an adaptive block prediction system. The subject adaptive block prediction system includes means and procedures for accomplishing a block of k output predictions, consisting of output predictions at each future time step up to the prediction horizon k, for dynamic systems with N outputs, M inputs and model parameter order n. The prediction system is organized for performing the calculation of a k-step ahead predictor in a highly computationally and memory efficient manner. The subject prediction system, in particular, avoids computation of a large number of the predictor parameters associated with the prior art Diophantine equation method, so that memory requirements and computational complexity are significantly reduced. The subject block control system in conjunction with an adaptive block prediction system includes means for accomplishing predictive controls of dynamic systems. It subsumes most, if not all, existing extended horizon predictive controllers. The subject block control system is based on the use of a special computational method. A hardware implementation of the subject extended horizon predictive control system includes a computing means, memory means, and dynamic system input and output signal processing means. The subject invention is primarily devised for real time control of dynamic systems.

34 Claims, 10 Drawing Sheets

OTHER PUBLICATIONS

Dong et al., *A Unified Approach to the Analysis and Design of Predictive Control*, 1991 American Control Conference, Boston, Mass. pp. 1744–1745.

Favier et al., *A Review of k–Step-ahead Predictors*, vol. 26, No. 1, pp. 75–84, 1990.

De Keyser et al., *A Comparative Study of Self-Adaptive Long-Rang Predictive Control Methods*, vol. 24, No. 2, 1988 Automatica; pp. 149–163.

Horn et al., *Matrix Analysis*, 1988 pp. 26–27.

Goodwin et al., *Adaptive Filtering Prediction and Control*, 1984 pp. 267–271.

Koivo, *A Multivariable Self-Tuning Controller*, 1980 pp. 351–366. Automatica, vol. 16.

Ljung, *System Identification: Theory for the User*, 1987 pp. 303–317.

Richalet et al., *Model Predictive Heuristic Control Applications to Industrial Processes*, vol. 14, No. 5, 1978 pp. 413–419, Automatica vol. 14.

Soeterboek et al., *A Predictive Controller for the Mach Number in a Transonic Wind Tunnel*, vol. 11, No. 1, 1991 pp. 63–72, IEEE Control Systems.

Voss et al., *Regarding Self-Tuning Controllers for Non-minimum Phase Plants*, vol. 23, No. 1, pp. 405–408, 1987 Automatica.

Wellstead et al., *Self-Tuning Pole/Zero Assignment Regulators*, 1979 Int. J. Control, vol. 30 No. 1 pp. 1–26.

Ydstie et al., *Single- and Multi-Variable Control with Extended Prediction Horizons*, pp. 1303–1308, 1984.

Spectrum Signal Processing Inc. Product Catalog, 1993.

EXTENDED HORIZON ADAPTIVE BLOCK PREDICTIVE CONTROLLER WITH AN EFFICIENT PREDICTION SYSTEM

FIELD OF THE INVENTION

This application relates generally to the control and prediction of multivariable dynamic systems. The present invention is particularly applicable to real time automatic control systems and apparatus and more specifically to a class of adaptive controllers utilizing dynamic system prediction techniques and will be described with particular reference thereto, although it will be appreciated that the invention has broader applications.

BACKGROUND OF THE INVENTION

High performance, computationally efficient real-time dynamic controller software and hardware are required for use in complex multi-input, multi-output, nonlinear, time-varying systems that are operating in challenging environments. In particular, there is a need for efficient and reliable controllers for dynamic systems having large numbers of system inputs and outputs. The need for robust, adaptive controllers arises from the fact that systems engineers always encounter modeling uncertainties and unmeasurable external perturbations when designing control systems. It is generally impossible to describe the dynamics of most real systems by precise mathematical models. Although very good system models can be obtained for some devices in artificial laboratory environments, accurate modeling is unrealistic in complex and challenging environments.

Existing adaptive controllers such as the adaptive Pole Placement controller and the Minimum Variance controllers are promising approaches to accomplish these control tasks. However, they suffer from two potentially crippling limitations: (1) computational complexity, which limits their feasibility in multivariable applications; and (2) sensitivity to the choice of the input-output delays and model order selection. There has been considerable research recently in the development of adaptive controllers that attempt to overcome these limitations. A major focus has been the development of extended horizon predictive control methods.

PREVIOUS PREDICTIVE CONTROLLERS

The simplist predictive controllers, such as the Minimum Variance and the Generalized Minimum Variance methods, take into account the fact that the dynamic system has an input-output delay D. Control input is chosen to make the system match some desired trajectory in D steps ahead. Recently, predictive controllers that consider time horizons beyond the system input-output delay (extended horizon predictive controllers) have been used in engineering applications. The motivation for doing this is two-fold. First, the input-output delays of a dynamic system are usually not known in advance, and if the time delays are incorrectly estimated, or the delays are time varying as the system progresses, then the system input-output stability can suffer. Second, for high performance controller designs with fast sampling, the resulting sampled dynamic system often has nonminimum phase zeros (having zeros outside the unit circle). In this case, when the choice of control is only based on the beginning of the system step response, the controller often does not perform well.

Inside all extended horizon predictive and adaptive predictive controllers is a 'predictor' that estimates future values of certain quantities related to the system outputs, based on current and past values of inputs and outputs. If the prediction horizon k extends beyond the system delay, D, then the set of (k−D) future inputs (u(t),u(t+1), . . . , u(t+k−D)) must be assumed. Different predictive and adaptive predictive controllers make different assumptions (or place different constraints) on these 'extra' inputs. The predicted system outputs are then used to compute the control inputs, based upon some criterion. Several extended horizon predictive controllers have been developed previously. They differ in how the set of future controls is chosen. These controllers include: the Extended Horizon Adaptive Control (EHC), the Receding Horizon Adaptive Control (RHC), the Control Advance Moving Average Controller (CAMAC), the Extended Prediction Self-Adaptive Control (EPSAC), the Generalized Predictive Controller (GPC), the Model Predictive Heuristic Control (MPHC), and the Dynamic Matrix Control (DMC).

The EHC predictive controller developed by Ydstie is based on an Auto-Regressive Moving-Average with auxiliary input (ARMAX) model description of the dynamic system, as described in Goodwin and Sin. The set of k future controls is chosen by minimization of the control effort, subject to the constraint that the k-step ahead predicted output is equal to some desired value. In the EHC, two implementation approaches have been used: extended horizon and receding horizon implementations. In the extended horizon implementation, the set of k future controls is implemented sequentially and updated every k samples. In the receding horizon implementation of the EHC (i.e., the RHC), only the first control in the set is applied to the system. At the next sampling instant, the whole set of k future controls is computed and again only the first one is used. In the extended horizon implementation, the EHC can stabilize both open loop unstable and nonminimum phase systems. The RHC, however, cannot stablize an open loop unstable system in general.

The CAMAC controller developed by Voss et al, differs from the EHC controller in the selection of the set of future controls. In the CAMAC controller, all k future controls are assumed to be constant. This choice assures offset-free tracking performance in steady state, even without an integral action. The CAMAC controller can also be used for both receding horizon and extended horizon implementations. Again, the CAMAC controller can fail if the open loop system is unstable. Both the EHC and the CAMAC controllers have considered the output at only one future point in time.

The GPC controller developed by Clarke et al extends this idea by allowing the incorporation of multi-step output predictions. The set of k future controls in the GPC is determined by the minimization of a quadratic cost function of predicted output tracking errors and controls, up to a horizon value into the future. The GPC is implemented in a receding horizon manner, as in the RHC controller. The GPC controller is effective for both open loop unstable and nonminimum phase systems. Because a Controlled Auto-Regressive Integrated Moving-Average (CARIMA) model is used to model the dynamic systems and to predict the output, the GPC controller always contains an integrator. The GPC controller includes the EPSAC controller as a special case.

The MPHC controller by Richalet et. al. makes output predictions, based on an approximated impulse response model. On the other hand, the DMC controller by Cutler and Ramaker are based on an approximated step response model. Therefore, both MPHC and DMC controllers can be only applied to open loop stable systems. However, the DMC controller can stablize a nonminimum phase system.

The block controller of the subject invention differs from all above-mentioned controllers in that a block input and block output dynamic relationship and a, block state structure are used. The subject multi-input, multioutput block controller is built upon the single input and single output predictive controller developed in Dong and Chizeck. In particular, it is applicable for the control of multi-input and multi-output dynamic systems. It includes all existing predictive controllers as special cases. Each of the above controllers can be represented as a different special case of the subject block controller if certain values of the controller tuning parameters are enforced.

PREVIOUS OUTPUT PREDICTION METHODS

Prediction of the outputs of the dynamic system can be accomplished based on a system model description. For the dynamic systems that can be linearized using a linear model the general ARMAX model can be used to describe the input and output relationship of the dynamic systems:

$$A(q^{-1})y(t) = B(q^{-1})u(t-1) + C(q^{-1})w(t) \qquad (1)$$

where u(t) is the dynamic system input of dimension M at time t:

$$y(t) = (y_1(t) y_2(t), \ldots, u_M(t))^T \qquad (2)$$

y (t) is the dynamic system output of dimension N at time t:

$$y(t) = (y_1(t) y_2(t), \ldots, y_N(t))^T \qquad (3)$$

and w(t) is the noise term of dimension N at time t. It includes the effects of all unmeasured disturbance signals (stochastic noises as well as load disturbances) and of linearization offsets:

$$w(t) = (w_1(t) w_2(t), \ldots, w_M(t))^T \qquad (4)$$

Here $q^{-1}$ denotes the backward shift operator operating as $g^-y(t) = y(t-1)$. This notation is customary for the description of real-time adaptive controllers, and is described in Goodwin, et al., Adaptive Filtering Prediction and Control, 1984 $A(q^{-4}) = \{A_{ij}(q^{-1})\}(i=1,2,\ldots,N,j=1,2,\ldots,N)$ is an N by N polynomial matrix with polynomial entries $A_{ij}(q^{-1})$:

$$A_{ij}(q^{-1}) = a_0{}^{ij} + a_1{}^{ij}q^{-1} + \ldots + a_{naij}q^{-naif} \qquad (5)$$

and $B(q^{-1}) = \{B_{ij}(q^{-1})\}(i=1,2,\ldots,N,j=1,2,\ldots,M)$ is N by M polynomial matrix with polynomial entries $B_{ij}(q^{-1})$:

$$B_{ij}(q^{-1}) = b_0{}^{ij} + b_1{}^{ij}q^{-1} + b_{nbij}{}^{ij}q^{-nbif} \qquad (6)$$

For the noise filter $C(q^{-1})$, it is assumed that the noise components for the $i^{th}$ loop can be combined into a single colored noise sequence $C_i(q^{-1})w_i(t)$ where for i=1,2,...,N:

$$C_i(q^{-1}) = 1 + c_1{}^{if}q^{-1} + \ldots + c_{ncij}{}^{if}q^{-ncli} \qquad (7)$$

If this is not the case, we can make it so by premultiplying the adjoint matrix of C ($q^{-1}$), so as to convert it into an equivalent ARMAX model where $C(q^{-1})$ is diagonal.

If the parameters in (1) are considered to be unknown parameters, then their estimates can be obtained on the basis of measured system inputs and outputs, and adjusted in response to the changes in the system dynamics, using a parameter identification method such as an recursive least square method as described in Ljung and Soderstrom. The estimated parameters (and thus the prediction system and controller operation) will, in general, be time varying. This allows for the tracking of time varying parameters and progressive refitting of a linear model approximation of a nonlinear system.

For the control of certain type of dynamic systems, such as lightly damped systems, it is often difficult to achieve the desired response to the command inputs on the basis of predictions of the system output alone. In such situations, predictor filters can be used to change the closed loop response properties. Another use of predictor filters is to reduce the interaction in multivariable control applications. The filtered output to be predicted can, in general, be described as:

$$z(t) = T(q^{-1})y(t) \qquad (8a)$$

where predictor filter $T(q^{-1}) = \{T_{ij}(g^{-1})\}$ for i=1,2, ...,N;j=1,2,...,N where each entry of T can be factored into a ratio of two polynomials by $$T_{ij}(q^{-1}) = \frac{F_{ij}(q^{-1})}{R_{ij}(q^{-1})} \qquad (8b)$$

Where it is assumed that polynomial $R_{ij}(q^{-1})$ is monic, (i.e., the first coefficient is unity) and that it is stable.

Linear model representation of the dynamic system, in conjunction with an identification tool, can suffer if the effect of linearization offsets are significant. To reduce the effect of linearization offsets in system modeling, an integrator can be added to an ARMAX model, resulting a CARIMA model. Another benefit of the use of integral action with the ARMAX model is that this allows automatic removal of offsets when incorporated in a predictive controller.

Prediction of dynamic system outputs also involves a variety of data filtering and update operations. Data filtering in the output prediction serves two main purposes. First, it can be used to enhance the input and output signals by removing the noise and disturbances. Second, data filtering can be used to minimize the mean square output prediction errors.

There are well known time series analysis techniques for real time. prediction of ARMAX or CARIMA models, in which the coefficients of a k-step ahead predictor are computed sequentially, via the solutions of a matrix Diophantine equation. Several forms of such predictor systems are described in Favier and Dubois, Borsson, Koivo and Clark et al. In prior art applications, a typical Diophantine equation procedure requires the solution of two polynomial matrix Diophantine equations. Specifically, the first matrix Diophantine equation $$\det(C(q^{-1})) = \mathrm{adj}(C(q^{-1}))A(q^{-1}) \cdot F(q^{-1}) + q^{-k}G(q^{-1}) \qquad (9)$$

is used for the computation of the output data coefficient matrix $G(q^{-1})$. The second matrix Diophantine equation $$F(q^{-1})\mathrm{adj}(C(q^{-1}))B(q^{-1}) = \det(C(q^{-1}))F'(q^{-1}) + q^{-k}G'(q^{-1}) \qquad (10)$$

is used to obtain the input data coefficient matrices $F'(q^{-1})$ and $G'(q^{-1})$.

The solution to equation (9) involves the determination of $(N^3 \times n) + (N^2 \times k)$ scalar quantities from the N coupled polynomial Diophantine equations. The solution to equation (10) amounts to the solution of N coupled polynomial scalar Diophantine equations involving the determination of $(N^2 \times M \times n) + (N \times M \times k)$ scalar quantities. Thus a total of $(N^3 \times n) + (N^2 \times M \times n) + (N^2 \times k) + (N \times M \times k)$ scalar quantities must be determined for each k-step predictor. For the large dimensional dynamic systems, this computation is very inefficient because of the large memory storage for the coefficient matrices, and because of the computational intensity in the solutions of those coefficient matrices. This is particularly true for the system having a large number of outputs and a high model parameter order.

The primary computational task in solving (9) and (10) are the calculation of the predictor input and output coefficient matrices. A vectored notation for equations (9) and (10) reveals that the solution of equation (9) requires approximately $(2 \times N^3 \times n \times k) + (2 \times N^3 \times n^2)$ floating point operations (flops) and that the solution of equation (10) requires roughly $(2 \times N^2 \times M \times n^2) + (2 \times N^2 \times M \times n \times k)$ flops. Secondary tasks are to perform multiplications of the predictor input and output coefficient matrices with the associated input and output data vectors. Approximately $2 \times N^3 \times n$ flops are needed for multiplying the output coefficient matrices with the output data vectors and $2 \times N^2 \times M \times n$ flops are needed for multiplying the input coefficient matrices with the input data vectors. Thus, the standard Diophantine equation method requires about $2 \times N^2 \times (N+M) \times (n+k+1) \times n$ flops for accomplishing the computation of a k-step predictor. For example, to compute the 10-step predictor for a modest system with 10 inputs and 10 outputs and a model order of 10, it will requires about 840 thousand flops.

For controller methods where a bank of predictors (i.e., k-step predictors for $i = 1, 2, \ldots, k$) are needed, the Diophantine equation method must solve 2k matrix Diophantine equations (with each i-step predictor being associated with two equations). Although the computational intensity can be somewhat reduced by using a recursive solution method for the Diophantine equations, the input and output coefficient matrices must still be computed for each i-step predictor. Thus, a total of at least $(N^3n + N^2Mn + N^2)k$ scalar quantities must be determined when a bank of predictors is needed. Thus, recursive solution methods for the Diophantine equations for the above mentioned example requires about 21 kilobytes of memory. Therefore, techniques to efficiently compute the predictor and to minimize the storage requirements, such that the computation of the large number of predictor coefficients can be avoided and hence memory storage can be reduced, as is accomplished by the subject invention, are crucial for real time prediction of dynamic systems. This includes real time control and adaptive control applications.

Although the output predictor reported in Dong and Chizeck makes use of blocks of inputs and outputs, the subject prediction system incorporates a unique construction of the block state structure which makes the subject prediction system computationally efficient.

Accordingly, it is an object of the present invention to provide a unified method and apparatus for the implementation of extended horizon predictive controllers.

It is another object of the present invention to provide a method and apparatus for the output prediction of those multivariable dynamic systems which can be approximated by a linear model.

It is another object of the present invention to provide an improved prediction method for multivariable dynamic system outputs.

It is a further object of the present invention to streamline the predictor implementation and to obtain predictions in a computationally efficient way.

It is also an object of the present invention to provide an efficient predictor system for adaptive multivariable predictive controllers.

These objects of the invention will become clear to those having the benefit of this disclosure.

SUMMARY OF THE INVENTION

The method of the present invention includes three embodiments. The first embodiment is the general block predictive controller that computes, updates and implements a predictive control law. The second embodiment is the efficient prediction system that generates the output predictions for multivariable dynamic systems that can be approximated as a time varying linear model. The third embodiment contains a detailed implementation of the efficient prediction system. The subject invention unifies existing extended horizon predictive controllers. The subject invention contains a general method for obtaining output predictions, utilizing a block state structure. The subject invention contemplates a new and improved prediction system for multivariable dynamic system output prediction. The subject invention reduces run time and memory requirements. The computational savings of the subject invention, in terms of floating point operations, compared to the Diophantine equation method, is cubic in the number of the system outputs N, quadratic in the dynamic system order n, and linear in both number of the system inputs M and horizon k. Specifically, let:

N = number of outputs in the multivariable system
M = number of inputs in the multivariable system
n = maximum number of {A, B, C} polynomial terms in the ARMAX model
k = prediction horizon Then for calculation of a single, fixed step k-step ahead predictor: using standard Diophantine equation type methods, approximate $N^3n + N^2Mn + N^2k + NMk$ scalar quantities must be computed, requiring about $2N^2(N+M)(n+k+1)n$ floating point operations. For the subject predictor system herein, only $N^2k + Nn + NMK$ quantities must be computed. This results in a savings of $(N^3 + N^2M - N)n$ fewer scalar quantities to be stored. The number of flops required is $2N^2[(N+M)(n+k)]n$. Thus using the subject predictor system, a savings of $2N^2(N+M)n$ flops is obtained. In situations where a whole block of predictors or a bank of predictors is required (for horizons up to k), the savings are even larger. Compared to Diophantine methods, the savings is $2N^2n[(N+M)n(k-1)+(N+M-1)k]$ flops (requiring $Nn[KN^2+NM-1]$ fewer scalar quantities). The savings in flops, for the predictor portion alone of the adaptive controller, is cubic in system output dimension N, quadratic in the ARMAX model order n, and linear in both input dimension M and horizon k.

BRIEF DESCRIPTION OF THE DRAWINGS

The subject invention will be described in conjunction with a sell of figures wherein the illustrations are for the purpose of illustrating the preferred embodiment of the invention only.

DETAILED DESCRIPTION OF THE PREFERRED EMBODIMENTS:

Now, embodiments of the present invention will be described in detail with reference to the drawings.

Figure 1:
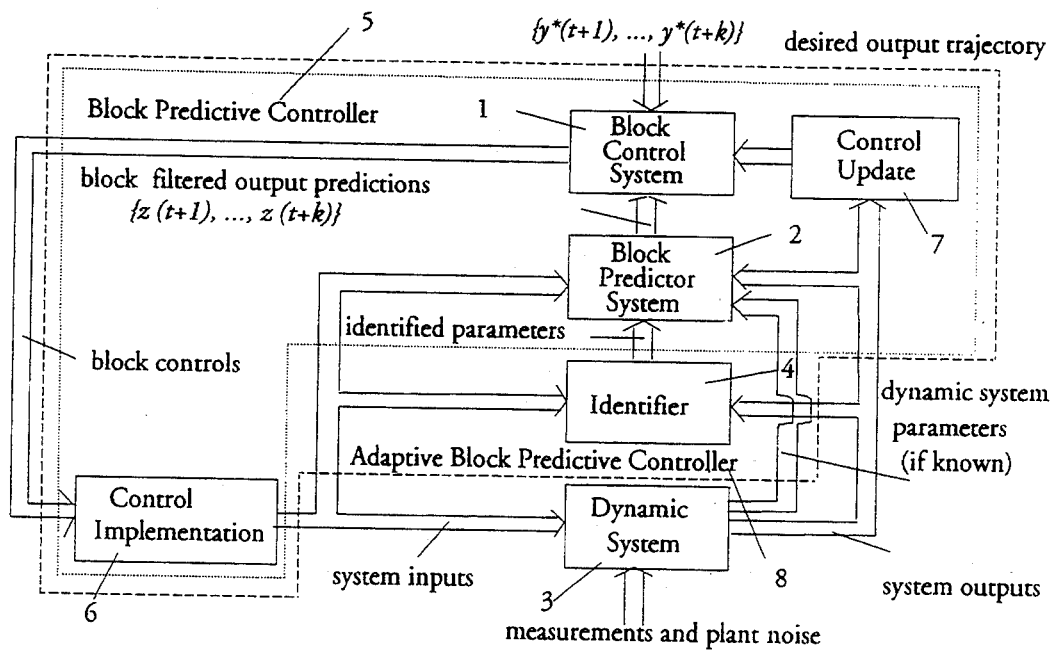
FIG. 1 the diagram of the structure of the Adaptive Block Predictive Controller.

FIG. 1 illustrates the overall structure of extended horizon adaptive block predictive controller with an efficient prediction system. A block of potential system inputs (block controls) $(u(t),u(t+1), \ldots ,u(t+k-1))$ is determined by Block Control System 1, based upon a block of the desired output trajectory $(y^*(t+1), y^*(t+2), \ldots , y^*(t+k))$ and i) a block of predicted outputs $(y_p(t+1),y_p(t+2), \ldots ,y_p(t+k))$ when no filtering of the system outputs is used, or a block of predicted filtered outputs $(z_p(t+1),z_p(t+2), \ldots ,z_p(t+k))$ when filtering of the system outputs is used, both being generated by Block Predictor System 2. The block of predicted outputs are based upon measurements of the system outputs of the Dynamic System 3, and either dynamic system parameters from 3, if known or identified parameters from the Identifier 4. Both the inputs and outputs of the Dynamic System 3 may be corrupted by noise. The Block Predictive Controller 5 consists of the Block Control System 1, the Block Predictor System 2, the Control Implementation 6 and the Control Update 7. The Block Predictive Controller 5 together with Identifier 4, comprises the Adaptive Block Predictive Controller 8. This Adaptive Block Predictive Controller 8 resides within a computational engine described later. For predictive control with horizon k, the Block Predictor System 2 must generate a one of the predicted outputs $(y_p(t+1),y_p(t+2), \ldots ,y_p(t+k))$ or predicted filtered outputs $(z_p(t+1),z_p(t+2), \ldots ,z_p(t+k))$ in order to choose block controls. If k=D, then u(t) is chosen at time t. If k≧D, then additional inputs $u(t+1), \ldots ,u(t+k-D)$ must also be chosen at time t. If D is not known, then $u(t+1), \ldots ,u(t+k-1)$ can be chosen. Two issues in this adaptive block predictive controller configuration that concern how measured information and parameter estimates are used, are the update method and implementation method. Control Implementation 6 refers to the implementation method. The whole block controls $(u(t),u(t+1), \ldots ,u(t+k-1))$ that is computed by the Block Control System 1 at time t can be used. Then new block controls are obtained k steps later. This results in an extended horizon implementation. An alternative is to have only the first element in the block controls, u(t), actually delivered to the system. The other calculated elements of the block controls at time t are not used. Then at time t+1, the calculation process is repeated for new block controls, and only the first element is used. This is a receding horizon implementation method. It is also possible to use the first i<k of the inputs. This is the i-step implementation method. The full extended horizon and the receding horizon implementation methods have been used by prior art predictive controllers. The i-step implementation method described here is novel. Control Update 7 refers to the update method. The calculation of the output predictions in the Block Predictor System 2 depends upon measured outputs, y, and parameter estimates. In block-by-block updates, new parameter estimates and output measurements are provided only every k time steps. In element-by-element updates, the output measurements and parameter estimates are updated at each time step.

Figure 2:
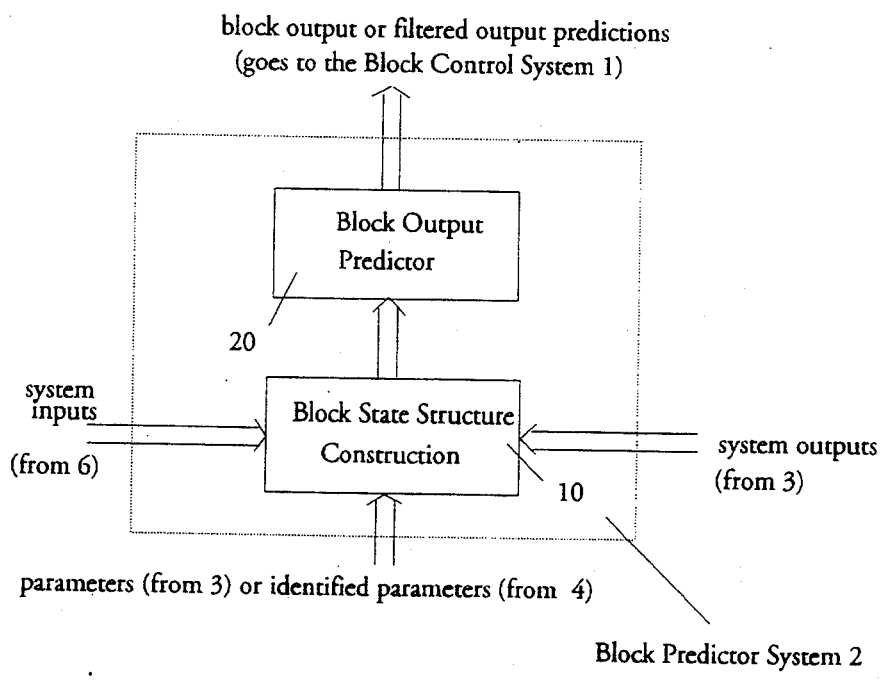
FIG. 2 is the diagram outlining the procedures of obtaining a prediction of blocks of dynamic system outputs

FIG. 2 further describes the Block Predictor System 2 of FIG. 1. It comprises a Block State Structure Construction 10 and a Block Output Predictor 20. The Block Output Predictor 20 generates a block of k output predictions $(y_p(t+1),y_p(t+2), \ldots , y_p(t+k))$ (when the filtering is used) or a block of k filtered output predictions $(z_p(t+1),z_p(t+2), \ldots ,z_p(t+k))$ (when filtering is used), where k is the prediction horizon. The system inputs from the Control Implementation 6, the system outputs from the Dynamic System 3, and the parameters of the Dynamic System 5 when the parameters are known, or the parameter estimates from the Identifier 4 when the parameters of the Dynamic System 3 are unknown (adaptive case), are used for the Block State Structure Construction 10. This requires five steps.

Construction of the N by N polynomial matrix $E(q^{-1})$ at time t as follows:

$$E(q^{-1}) = \{E_{ij}(q^{-1})\} \quad (i = 1, 2, \ldots, N; j = 1, 2, \ldots, N) \tag{2.1}$$

$$E_{ij}(q^{-1}) = A_{ij}(q^{-1})R_j(q^{-1})(1 - q^{-1}) \tag{2.2}$$
$$= e_0^{ij} + e_1^{ij}q^{-1} + \ldots + e_{neij}^{ij}q^{-neij}$$

with polynomial $R_j(q^{-1})$ for $j=1,2,\ldots,N$ being the least common multiples of polynomials $R_{ij}(q^{-1})$ of (8b) for $i=1, 2, \ldots, N$.

Construction of the filtered outputs $\psi(t)$ at time t as:

$$\psi(t) = (R(q^{-1}))^{-1}y(t) \tag{2.3}$$
$$= (\psi_1(t), \psi_2(t), \ldots, \psi_N(t))^T$$

where polynomial matrix $R(q^{-1})$ of dimension N by N is defined to be:

$$R(q^{-1}) = \text{diag}\{R_1(q^{-1}), R_2(q^{-1}), \ldots, R_N(q^{-1})\} \tag{2.4}$$

Note that the $R_{ij}$'s in (8b) are not the $ij^{th}$ element of this $R(q^{-1})$. Rather, $R(q^{-1})$ in (2.4) is defined from the $R_j(q^1)$ of (2.2) which are the least common multiples of polynomials $R_{ij}(q^{-1})$ of (8b). Of course, setting $(Rcq^{-1})$ equal to the identify matrix results in $\psi(t)$ to be exactly equal to $y(t)$ and hence no filtering is performed, Construction of the Input Block U(t) of dimension Mk by 1, the Filtered Output Block $\Psi(t)$ of dimension Nk by 1 and Noise Block W(t) of dimension Nk by 1 at time t as follows:

$$\Psi(t) = (\Psi_1(t), \Psi_2(t), \ldots, \Psi_N(t))^T \tag{2.5}$$

$$U(t) = (U_1(t), U_2(t), \ldots, U_M(t))^T \tag{2.6}$$

$$W(t) = (W_1(t), W_2(t), \ldots, W_N(t))^T \tag{2.7}$$

$$\Psi_i(t) = (\psi_i(t+k), \psi_i(t+k-1), \ldots, \psi_i(t+1))^T \tag{2.8}$$

$$U_i(t) = (u_i(t+k-1), u_i(t+k-2), \ldots, u_i(t))^T \tag{2.9}$$

$$W_i(t) = (w_i(t+k), w_i(t+k-1), \ldots, w_i(t+1))^T \tag{2.10}$$

In (2.5), $\psi_i(t)$ for $i=1,2,\ldots,N$ is the $i^{th}$ filtered output block of size k. In (2.6), $U_i(t)$ for $i=1, 2, \ldots, M$ is the $i^{th}$ input block of size k. In (2.3), $W_i(t)$ for $i=1, 2, \ldots, N$ is the $i^{th}$ loop noise block of size k.

Construction of the Block System that relates nonoverlapping blocks of $\psi(t)$, U(t) and W(t) in terms of matrix polynomials $\overline{E}(d^{-1})$, $\overline{B}(d^{-1})$ and $\overline{C}(d^{-1})$ in the k-fold backward shift operator $d^{-1}$ defined as $q^{-k}$:

$$\overline{E}(d^{-1})\psi(t) = \overline{B}(d^{-1})U(t) + \overline{C}(d^{-1})W(t) \tag{2.11}$$

$$\overline{E}(d^{-1}) = \{\overline{E}_{ij}(d^{-1})\} \quad (i=1,2,\ldots,N; j=1,2,\ldots,N) \tag{2.12}$$

$$\overline{B}(d^{-1}) = \{\overline{B}_{ij}(d^{-1})\} \quad (i=1,2,\ldots,N; j=1,2,\ldots,M) \tag{2.13}$$

$$\overline{C}(d^{-1}) = \text{diag}\{\overline{C}_{11}(d^{-1}), \overline{C}_{22}(d^{-1}), \ldots, \overline{C}_{NN}(d^{-1})\} \tag{2.14}$$

Here the polynomial submatrices $\overline{E}_{ij}(d^{-1})$, $\overline{b}_{ij}(d^{-1})$ and $\overline{C}_{ij}(d^{-1})$ are all constructed in a special circulant structure, known as the dynamic shift Toeplitz matrix structure. For example, the submatrix $\overline{E}_{ij}(d^{-1})$ for $k=3$ case can be written as:

$$E_{ij}(d^{-1}) = \begin{pmatrix} E_1^{ij}(d^{-1}) & E_2^{ij}(d^{-1}) & E_3^{ij}(d^{-1}) \\ E_3^{ij}(d^{-1})\,d^{-1} & E_1^{ij}(d^{-1}) & E_2^{ij}(d^{-1}) \\ E_2^{ij}(d^{-1})\,d^{-1} & E_3^{ij}(d^{-1})\,d^{-1} & E_1^{ij}(d^{-1}) \end{pmatrix} \tag{2.15}$$

where $E_l^{ij}(d^{-1})$ for $l=1,2,3$ is a polynomial in $d^{-1}$.

$$E_l^{ij}(d^{-1}) = e_{l-1}^{ij} + e_{l+k-1}^{ij}d^{-1} + \ldots + e_{l+kp-1}^{ij}d^{-p} \tag{2.16}$$
$$(l = 1, 2, \ldots, k)$$

$$p = \text{ceiling}\left(\frac{n}{k}\right) \tag{2.17}$$

Here n is the parameter order defined as max $$\max_{\substack{1 \leq i,j \leq N \\ 1 \leq l \leq M}} \{n_{eij}, n_{bil}, n_{cii}\}.$$

The notation ceiling in (2.17) denotes the largest integer in the fraction of n/k.

Note that the matrix polynomial $\overline{E}_{ij}(d^{-1})$ is completely determined by its first row. All of the submatrices in the above block system representation have this special structure. They are constant along all diagonals, and have a factor of $d^{-1}$ for all elements below the principal diagonal. Matrices of this circulant ("shift Toeplitz") type are commutative. transformation of the Block System (2.5), (2.6) and (2.7) into the following Block State Structure using the commutivity property of dynamic shift Toeplitz matrices.

$$\psi(t) = \text{MARKOV} \times U(t) + \text{REC} \times X(t) + W(t) \tag{2.18}$$

where

• MARKOV is the Nk by Mk Impulse Response Matrix constructed as:

$$\text{MARKOV} = \{\text{MARKOV}_{ij}\}(i=1,\ldots,N; j=1,\ldots,M) \tag{2.19}$$

Here submatrix $\text{MARKOV}_{ij}$ is a k by k upper-triangular Toeplitz matrix with vector $(g_1^{ij}, \ldots, g_k^{ij})$ being its first row and $\{g_l^{ij}\}_{l=1}^k$ are the first k impulse response parameters from the input $\Delta us(t)$ (defined as $u_i(t)-u_i(t-1)$) to the output $\psi_i(t)$

• REC is the Nk by nk Block State Mapping Matrix constructed as:

$$\text{REC} = \{\text{REC}_{ij}\}(i=1,\ldots,N; j=1,\ldots,N) \tag{2.20}$$

Here submatrix $\text{REC}_{ij}$ is a k by n matrix defined as:

$$REC_{ij} = \begin{pmatrix} s^{ij}_{-n+1} & s^{ij}_{-n+2}, & \ldots, & s^{ij}_{k} \\ s^{ij}_{k-n} & s^{ij}_{k-n+1}, & \ldots, & s^{ij}_{k-1} \\ \cdot & \cdot & & \cdot \\ \cdot & \cdot & & \cdot \\ \cdot & \cdot & & \cdot \\ s^{ij}_{-n+3} & s^{ij}_{-n+4}, & \ldots, & s^{ij}_{2} \\ s^{ij}_{-n+2} & s^{ij}_{-n+3}, & \ldots, & s^{ij}_{1} \end{pmatrix} \quad (2.21)$$

Here $s_l^{ij}$ for $l>0$ is defined by the inverse of autoregressive polynomial matrix $E(q^{-1})$:

$$(E(q^{-1}))^{-1} = \left\{ \sum_{l=0}^{\infty} s_l^{ij} q^{-1} \right\} \quad (2.22)$$

$(i = 1, 2, \ldots, N, j = 1, 2, \ldots, N)$ with $s_l^{ij}=0$ for $l<0$ or, equivalently, by the inverse of the lowest degree coefficient matrix in $\bar{E}(d^{-1})$.

• $X(t)$ is the Block State of dimension N by n, constructed as:

$$X(t) = \sum_{j=1}^{N} \text{diag}\{\Gamma^{1j}, \ldots, \Gamma^{Nj}\} Y_f^j(t) + \sum_{j=1}^{M} \text{diag}\{\pi^{1j}, \ldots, \pi^{Nj}\} U_f^j(t) \quad (2.23)$$

Here $\Gamma^{ij}$ and $\Pi^{ij}$ are all anti-diagonal symmetric matrices of dimension n by n, defined as $$\Gamma^{ij} = \Delta_L(c^{ij}_1, \ldots, c_n^{ij}) \Delta^U(e_0^{ij}, \ldots, e_{n-1}^{ij}) - \Delta_L(e_1^{ij}, \ldots, e_n^{ij}) \Delta^U(c_0^{ij}, \ldots, c_{n-1}^{ij}) \quad (2.24)$$

$$\Pi^{ij} = \Delta_L(b_1^{ij}, \ldots, b_n^{ij}) \Delta^U(C_0^{ij}, \ldots, c_{n-1}^{ij}) - \Delta_L(c_1^{ij}, \ldots, c_n^{ij}) \Delta^U(b_0^{ij}, \ldots, b_{n-1}^{ij}) \quad (2.25)$$

with $\Delta_L(a_1, \ldots, a_n)$ denoting an n by n lower triangular Toeplitz matrix with $(a_1, \ldots, a_n)$ as its first row and $\Delta^U(a_1, \ldots, a_n)$ denoting an n by n upper triangular Toeplitz matrix with $(a_1, \ldots, a_n)$ as its last row.

• $Y_f(t)$ of dimension N by N by n is the Predictor Output Data at time t, constructed as follows:

$$Y_f(t) = (Y_1 f(t), Y_2 f(t), \ldots, Y_N f(t)) \quad (2.26)$$

Here submatrix $Y_i f(t)$ for $i=1,2,\ldots,N$ of dimension N by n contains the filtered $i^{th}$ output:

$$Y_i f(t) = (Y_i f^1(t), Y_i f^2(t), \ldots, Y_i f^N(t)) \quad (2.27)$$

The vectors $Y_i f^j(t)$ for $j=1,2,\ldots,N$ are obtained as follows:

$$y_i^{ij}(t) = (y_i^{ij}(t), y_i^{ij}(t-1), \ldots, y_i^{ij}(t-n+1))^T \quad (2.28)$$

$$y_i^{ij}(t) = \frac{y_i(t)}{C_{ij}(q^{-1}) R_j(q^{-1})} \quad (2.28)$$

$(i = 1, 2, \ldots, N; \quad j = 1, 2, \ldots, N)$ \quad (2.29)

• $U_f(t)$ of dimension N by M by n is the Predictor Input Data at time t:

$$U_f(t) = (U_1 f(t), U_2 f(t), \ldots, U_M f(t)) \quad (2.30)$$

Here submatrix $U_i f(t)$ for $i=1,2,\ldots,M$ is of dimension N by n. It contains the filtered $i^{th}$ input:

$$U_i f(t) = (U_i f^1(t), U_i f^2(t), \ldots, U_i f^N(t)) \quad (2.31)$$

The vectors $U_i f^j(t)$ for $j=1,2,\ldots,N$ are obtained as follows:

$$u_i^{ij}(t) = (u_i^{ij}(t), u_i^{ij}(t-1), \ldots, u_i^{ij}(t-n+1)) \quad (2.32)$$

$$u_i^{ij}(t) = \frac{u_i(t) - u_i(t-1)}{C_{ij}(q^{-1})} \quad (2.33)$$

$(i = 1, 2, \ldots, N; \quad j = 1, 2, \ldots, M)$

Block Output Prediction 20 uses the block state structure of (2.18) to generates the block predictor $Z_p(t)$ as follows. First, block predictor $\Psi_p(t)$ is obtained by minimizing the conditional expected mean squared prediction errors $E\{||\Psi(t) - \Psi_p(t)||^2\}$, conditioned on all inputs and outputs up to and including time t:

$$\Psi_p(t) = \text{MARKOV} \times U(t) 30 \text{ REC} \times X(t) \quad (2.34)$$

Note that the block filtered system output prediction $\Psi_p(t)$ is the product of the Impulse Response Matrix MARKOV with the Block Control $U(t)$ in summation with the product of the Block State Mapping Matrix-REC with the Block State $X(t)$, which is independent of the prediction horizon k.

The second step in the method of block 20 is to filter $\Psi_P(t)$ using the Nk by Nk polynomial matrix filter $\bar{P}(d^{-1})$:

$$Z_P(t) = \bar{P}(d^{-1}) \Psi_P(t) \quad (2.35)$$

with $d^{-1} \Psi_P(t) = \Psi(t-i)$ for $i<0$, where $$\bar{P}(d^{-1}) = \{\bar{P}_{ij}(d^{-1})\} (i=1,2,\ldots,N; j=1,2,\ldots,N) \quad (2.36)$$

Here the polynomial submatrix $\bar{P}_{ij}(d^{-1})$ is a dynamic shift Toeplitz matrix with its first row given by $(P_1^{ij}(d^{-1}), P_2^{ij}(d^{-1}), \ldots, P_k^{ij}(d^{-1}))$ (since this dynamic, shift Toeplitz matrix is completely determined by its first row) where $P_l^{ij}(d^{-1})$ for $l=1,2,\ldots$, is a polynomial in $d^{-1}$ defined as:

$$P_l^{ij}(d^{-1}) = p_{l-1}^{ij} + p_{l+k}^{ij} d^{-h} \quad (2.37)$$

$(l = 1, 2, \ldots, k)$ $$h = \text{ceiling}\left(\frac{n_{pij}}{k}\right) \quad (2.38)$$

and $P(q^{-1})$ is computed from $R(q^{-1})$ of (2.4) and filter $T(q^{-1})$ by $$P(q^{-1}) = T(q^{-1}) (R(q^{-1}))^{-1} = \{P_{ij}(q^{-1})\} \quad (2.39)$$

$(i = 1, 2, \ldots, N; \quad j = 1, 2, \ldots, N)$ and (2.37), (2.39) are related by $$P_{ij}(q^{-1}) = p_0^{ij} + p_1^{ij} q^{-1} + \ldots + p_{n_{pij}}^{ij} q^{n_{pij}} \quad (2.40)$$

The block predictor $Z_p(t)$ obtained by (2.35) can be also derived by directly minimizing the cost function of $E\{||Z(t)-Z_p(t)||\}$ (conditioned by all past inputs and outputs up to and including time t).

Figure 3:
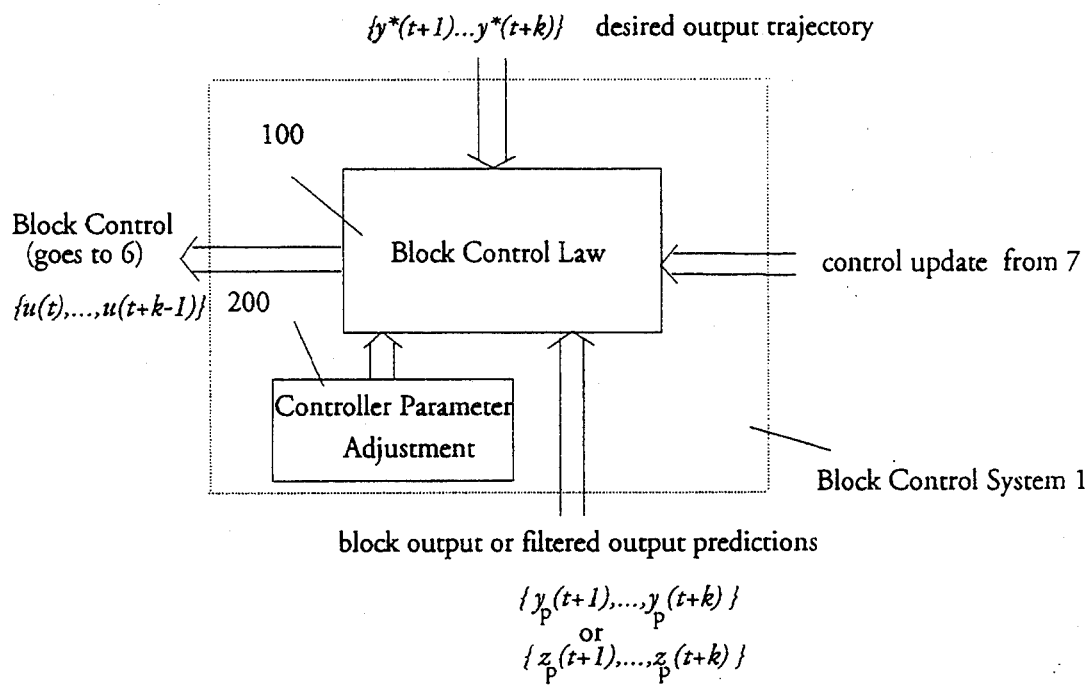
FIG. 3 is the diagram of the Block Control System.

FIG. 3 further describes the Block Control System 1. The Block Control Law 100 is described by the following equation:

$$R(d^{-1})U(t)=-Q(d^{-1})Z_p(t)+M(d^{-1})Y_r(t) \quad (3.1)$$

where $Y_r(t)$ is a given block desired output defined as:

$$Y_r(t)=(Y_{1r}^T(t),Y_{2r}^T(t),\ldots,Y_{Nr}^T(t))^T \quad (3.2)$$

with $$Y_{ir}=(y_i^p(t+1),y_i^p(t+2),\ldots,y_i^p(t+k)) \quad (3.3)$$

- $Z_p(t)$ is the block output (or block filtered output) prediction at time t with $d^{-1}Zp(t)=Z(t-i)$ for $i>0$.
- $R(d^{-1})=\{R_{ij}(d^{-1})\}(i=1,2,\ldots,N;j=1,2,\ldots,N)$ is the kM by kM polynomial matrix with polynomial submatrix $R_{ij}(d^{-1})$ being defined by $$R_{ij}(d^{-1})=R_0^{ij}+R_1^{ij}d^{-1}+\ldots+R_n^{ij}d^{-n}, \quad (3.4)$$

Here $R_l^{ij}(l=1,2,\ldots,n_i)$ is a k by k constant matrix.
- $Q(d^{-1})=\{Q_{ij}(d^{-1})\}(i=1,2,\ldots,M;j=1,2,\ldots N)$ is the kM by kN polynomial matrix with polynomial submatrix $Q_{ij}(d^{-1})$ being defined by $$Q_{ij}(d^{-1})=Q_0^{ij}+Q_1^{ij}d^{-1}+\ldots+Q_{nq}^{ij}d^{-nq} \quad (3.5)$$

Here $Q_l^{ij}(l=1,2,\ldots,n)$ is a k by k constant matrix.
- and $M(d^{-1})=\{M_{ij}(d^{-1})\}(i=1,2,\ldots,M;j=1,2,\ldots,N)$ is the kM by kN polynomial matrix with polynomial submatrix $M_{ij}(d^{-1})$ being defined by $$M_{ij}(d^{-1})=M_0^{ij}+M_1^{ij}d^{-1}+\ldots+M_{nq}^{ij}d^{-nm} \quad (3.6)$$

Here $M_l^{ij}(l=1,2,\ldots,n_m)$ is a k by k constant matrix.

This block control equation subsumes most existing extended horizon adaptive predictive controllers including the MHPC controllers, the DMC controller, the EHC controller, the CAMAC controller, the GPC controller, and the EPSAC controller. In Dong and Chizeck, several of the above-mentioned controllers are translated into a single input, single output block structure. The subject block controller described here is more general. In particular, it is applicable to the multi-input and multi-output case. The multivariable version of the GPC controller is given below. This is a typical example of the most commonly used controllers. Let $k_1,k_2,\ldots,k_N$ be the prediction horizons corresponding to system outputs $y_1(t),y_2(t),\ldots,y_n(t)$, respectively. Let $nu_1,nu_2,\ldots,nu_M$ be the control horizons corresponding to system inputs $u_1(t),u_2(t),\ldots,u_M(t)$, respectively. Let $k=\max\{k_1,k_2,\ldots,k_N\}$. Let minimum prediction horizons for outputs $y_1(t),y_2(t),\ldots,y_N(t)$ be $l_1,l_2,\ldots,l_N$, respectively. The multivariable GPC controller can be derived from the subject invention controller with the following choices of $R(d^{-1})$, $Q(d^{-1})$ and $M(d^{-1})$:

$$R(d^{-1})=\text{Diag}(\lambda_1 D(d^{-1}),\lambda_2 D(d^{-1}),\ldots,\lambda_M D(d^{-1}))\quad (3.7)$$

where $D(d^{-1})$ is a k by k dynamic shift Toeplitz matrix with the first row given by $(1,-1,0,\ldots,0)$ and $\lambda_i$ is a nonnegative control weighting factor for the $i^{th}$ input $u_i(t)$ for $i=1,2,\ldots,M$. $Q(d^{-1})$ and $M(d^4)$ are chosen as:

$$Q(d^{-1})=M(d^{-1})=(NU)(MARKOV^T)(P_0^T)(\Lambda)(BPS) \quad (3.8)$$

Here NU is a Mk by Mk block diagonal matrix:

$$NU=\text{diag}\{NU_1, NU_2,\ldots,NU_M\} \quad (3.9)$$

with diagonal submatrix $NU_i$ for $i=1,2,\ldots,M$ being $$NU_i = \text{diag }\{\underbrace{0,\ldots,0}_{nu_i \text{ zeros}}\ \underbrace{1,\ldots,1}_{(k-nu_i)\text{ ones}}\} \quad (3.10)$$

MARKOV is the Nk by Mk Impulse Response Matrix:

$$MARKOV=\{MARKOV_{ij}\}(i=1,\ldots,N;j=1,\ldots,M) \quad (3.11)$$

Here submatrix $MARKOV_{ij}$ is a k by k upper-triangular Toeplitz matrix with vector $(g_1^{ij},\ldots,g_k^{ij})$ being its first row and $\{g_l^{ij}\}_{l=1}^k$, are the first k impulse response parameters from the input $\Delta u_j(t)$ to the output $\psi_i(t)$ defined in (2.3).

$P_0$ is Nk by Nk constant matrix:

$$P_0=\{P_0^{ij}\}(i=1,2,\ldots,N;j=1,2,1\ldots,N) \quad (3.12)$$

with submatrix $P_0^{ij}$ is the k by k coefficient matrix of the lowest degree term of the dynamic shift Toeplitz matrix $\overline{P}_{ij}(d^{-1})$ of dimension k by k, with its first row given by $(P_1^{ij}(d^{-1}), P_2^{ij}(d^{-1}),\ldots,P_k^{ij}(d^{-1}))$ (since a dynamic shift Toeplitz matrix is completely determined by its first row) where $P_l^{ij}(d^{-1})$ for $l=1,2,\ldots,k$ is a polynomial in $d^{-1}$ defined as:

$$P_l^{ij}(d^{-1})=P_{l-1}^{ij}+P_{l+k-1}^{ij}d^{-1}+\ldots+P_{l+kh-1}^{ij}d^{-h}(l=1,2,\ldots,k) \quad (3.13)$$

Here $$h = \text{ceiling}\left(\frac{n_{pij}}{k}\right) \quad (3.14)$$

and $A=\text{diag}\{A_1,A_2,\ldots,A_N\}$ is a Ark by Nk block diagonal matrix with submatrix $A_i$ ($i=1,2,\ldots,N$) of dimension k by k being a diagonal matrix defined by $$\Lambda_i=\rho_i I \quad (3.16)$$

where $\rho_i$ for $i=1,2,\ldots,N$ is a posive scalar and I is the k by k identity matrix. BPS is the Nk by Ark matrix defined as $$BPS=\text{diag }\{BPS_1, BPS_2,\ldots, BPS_N\} \quad (3.17)$$

where BPS, ($i=1,2,\ldots,N$) is the k by k matrix:

$$BPS_i = \text{diag }\{\underbrace{1,\ldots,1}_{(k-l_i)\text{ ones}}\ \underbrace{0,\ldots,0}_{l_i \text{ zeros}}\} \quad (3.18)$$

Since the GPC controller includes the EPSAC controller as a special case, the above construction for the GPC controller also includes the EPSAC controller.

Figure 4:
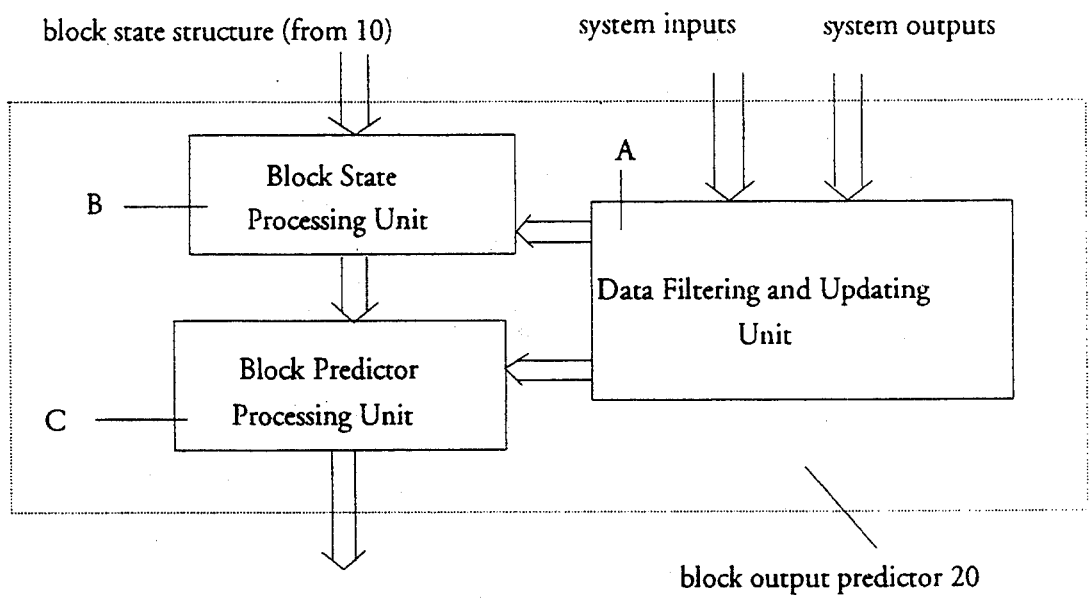
FIG. 4 is the diagram of the preferred Block Output Predictor.

FIG. 4 is the block diagram of the preferred block output predictor. It consists of three main units: the Data Filtering and Updating Unit A, the Predictor State Processing Unit B, the Block Predictor Processing Unit C. The preferred predictor system is organized to process the output y(t) or the filtered output z(t) predictions as follows. First, the Data Filtering and Updating Unit A filters inputs and outputs obtained from the dynamic system 3 at time t and then uses these filtered inputs and outputs to update the Predictor Input Data and the Predictor Output Data. Second, Unit B computes 2Block State X(t) using the updated Predictor Input Data and Predictor Output Data from Unit A. Next, the Block Predictor Processing Unit C computes the block output predictions $Y_p(t)$ or the block filtered output predictions $\Psi_p(t)$, recursively in horizon, using the Block State from Unit B. Finally, Unit C obtains the desired output predictions $Z_p(t)$ by filtering $\Psi_p(t)$ through the matrix polynomial filter $P(q^{-1})$. The detailed operations of the preferred predictor system are described below in conjunction with FIG. 5 to FIG. 13.

Figure 5:
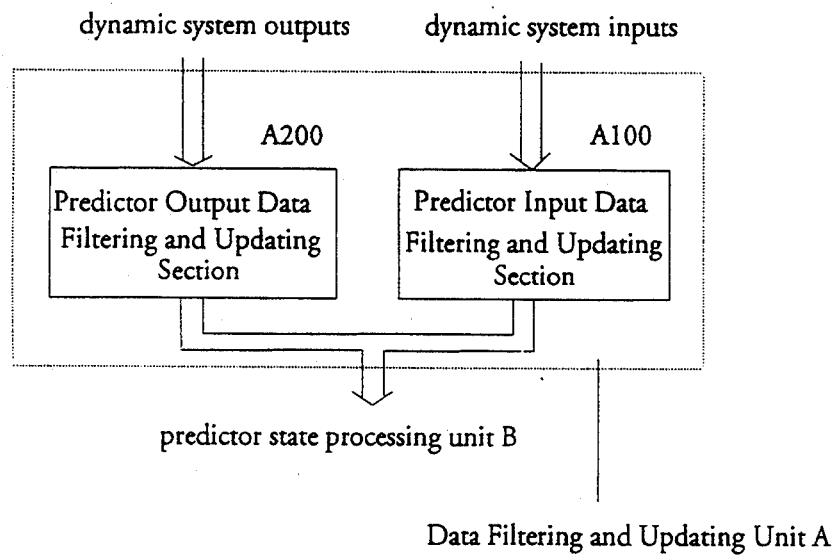
FIG. 5 is the diagram of the Data Filtering and Updating Unit.

FIG. 5 is the diagram of the Data Filtering and Updating Unit A. It contains two sections. Section A100 performs input filtering and updates the Predictor Input Data, $U^f$, from $U^f(t-1)$ at time $t-1$ to $U^f(t)$ of the present time, using newly obtained filtered system inputs. Here the t is the current time index. Section A200 performs output filtering and updates the Predictor Output Data, $Y^f$, from $Y^f(t-1)$ at time $t-1$ to $Y^f(t)$ at the present time t, using newly obtained filtered system outputs. The Predictor Input Data $U^f(t)$ and Predictor Output Data $Y^f(t)$ are then used to compute the Block State X(t) in Unit B. The Predictor Input Data and the Predictor Output Data need to be initialized at time $t=0$ and thereafter are filtered and updated sequentially.

Figure 6:
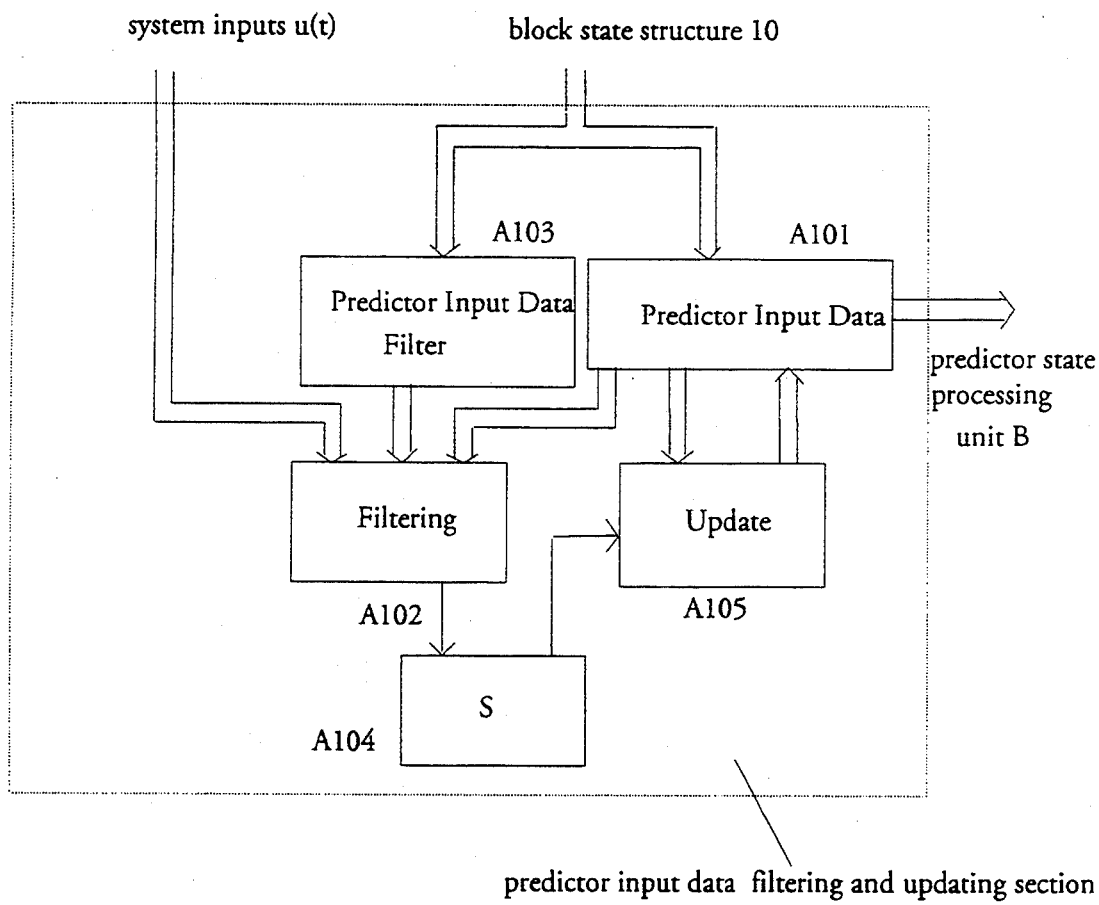
FIG. 6 is the flow chart of the Predictor Input Data Filtering and Updating Section.

FIG. 6 is the flow chart for the Predictor Input Data Filtering and Updating Section. The Predictor Input Data in A101 is constructed as a 3-dimensional array. At time $t-1$ (before being updated), $U^f$ can be written as $U^f(t-1) = (U_1^f(t-1), U_2^f(t-1), \ldots, U_M^f(t-1))$ where each $U_i^f(t-1)$ for $i=1,2,\ldots,M$ is a 2-dimensional array comprising the following vectors $U_i^f(t-1) = (U_i^{f1}(t-1), U_i^{f2}(t-1), \ldots, U_i^{fN}(t-1))$. The vector $U_i^{fj}(t-1)$ can be further expressed component-wise as $U_i^{fj}(t-1) = (u_i^{fj}(t-1), u_i^{fj}(t-2), \ldots, u_i^{fj}(t-n))^T$ for the value of $j=1,2,\ldots,N$ that contains n most recently filtered $i^{th}$ input. The Predictor Input Data filtering computes the filtered $i^{th}$ input $u_i^{fj}(t)$ for $i=1,2,\ldots,M$ and $j=1,2,\ldots,N$ in the following two steps. First, A102 performs a vector dot product of vector $U_i^{fj}(t-1)$ from A101 and filter polynomial $C_{ij}(q^{-1})$ from A103. The resulting value is saved as S in A104. Second, in A102 the filtered input $u_i^{fj}(t)$ is computed as: $u_i^{fj}(t) \leftarrow u_i(t) - u_i(t-1) - S$. A105 performs updating operations for the Predictor Input Data $U^f$, from $U^f(t-1)$ to $U^f(t)$, by updating each individual vector $U_i^{fj}(t-1)$ $i=1,2,\ldots,M$ and $j=1,2,\ldots,N$. The updated Predictor Input Data $U^f(t)$ is then used for the block state processing.

Figure 7:
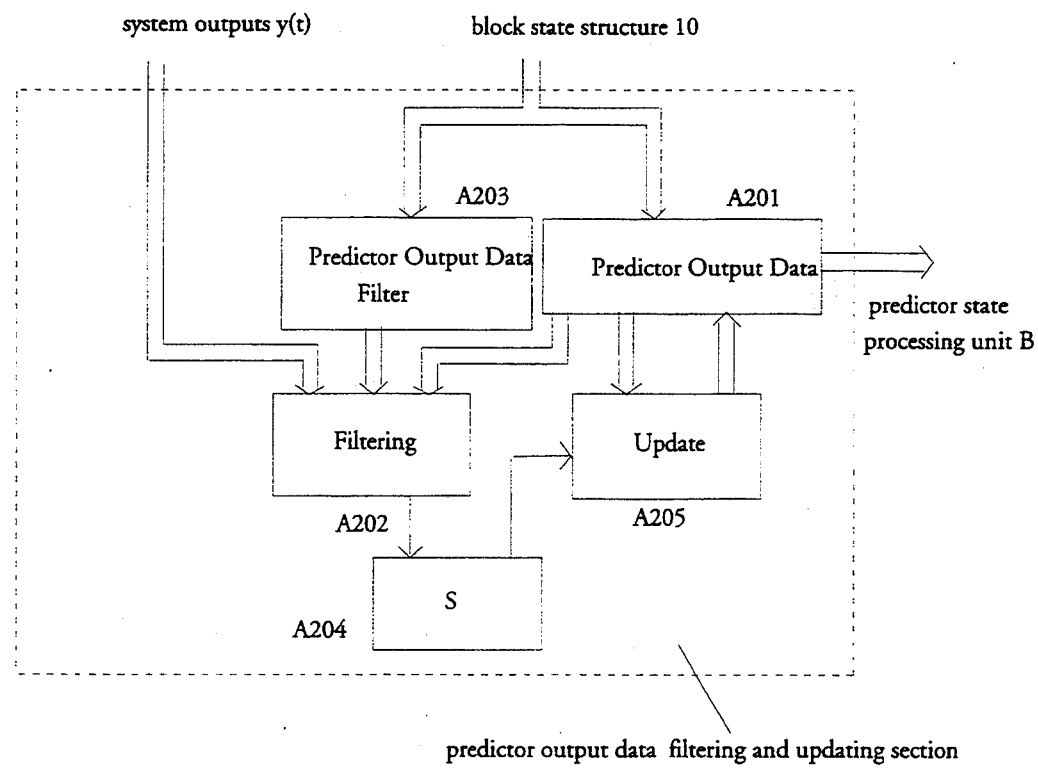
FIG. 7 is the flow chart of the Predictor Output Data Filtering and Updating Section.

The Predictor Output Data filtering and updating operations are performed similarly to those of the Predictor Input Data filtering and updating. FIG. 7 is the flow chart for the Predictor Output Data Filtering and Updating Section. The Predictor Output Data in A201 is constructed as a 3-dimensional array. At time $t-1$ (before being updated), $Y^f$ can be written as $Y^f(t-1) = (Y_1^f(t-1), Y_2^f(t-1), \ldots, Y_M^f(t-1))$ where each $Y_i^f(t-1)$ for the value of $i=1,2,\ldots,N$ is a 2-dimensional array comprising the following vectors $Y_i^f(t-1) = (Y_i^{f1}(t-1), Y_i^{f2}(t-1), \ldots, Y_i^{fN}(t-1))$. The vector $Y_i^{fj}(t-1)$ can be further expressed component-wise as $Y_i^{fj}(t-1) = (y_i^{fj}(t-1), y_i^{fj}(t-2), \ldots, y_i^{fj}(t-n))^T$ for the $j=1,2,\ldots,N$ that contains n most recently filtered $i^{th}$ output. The Predictor Output Data filtering operations compute the filtered $i^{th}$ output $y_i^{fj}(t)$ for $i=1,2,\ldots,N$ and $j=1,2,\ldots,N$ in the following two steps. First, A202 performs a vector dot product of vector $Y_i^{fj}(t-1)$ from A201 and filter polynomial $C_{ij}(q^{-1})R_j(q^{-1})$ from A203. The resulting dot product value is saved in S of A204. Second, in A202 the filtered output $y_i^{fj}(t)$ is computed as: $y_i^{fj}(t) \leftarrow y_i(t) - S$. A105 performs updating operations for the Predictor Output Data $Y^f$ from $Y^f(t-1)$ of $t-1$ to $Y^f(t)$ of the present time by updating each individual vector $Y_i^{fj}(t-1)$ $i=1,2,\ldots,N$ and $j=1,2,\ldots,N$. The updated Predictor Output Data $Y^f(t)$ is then used for the block state processing.

Figure 8:
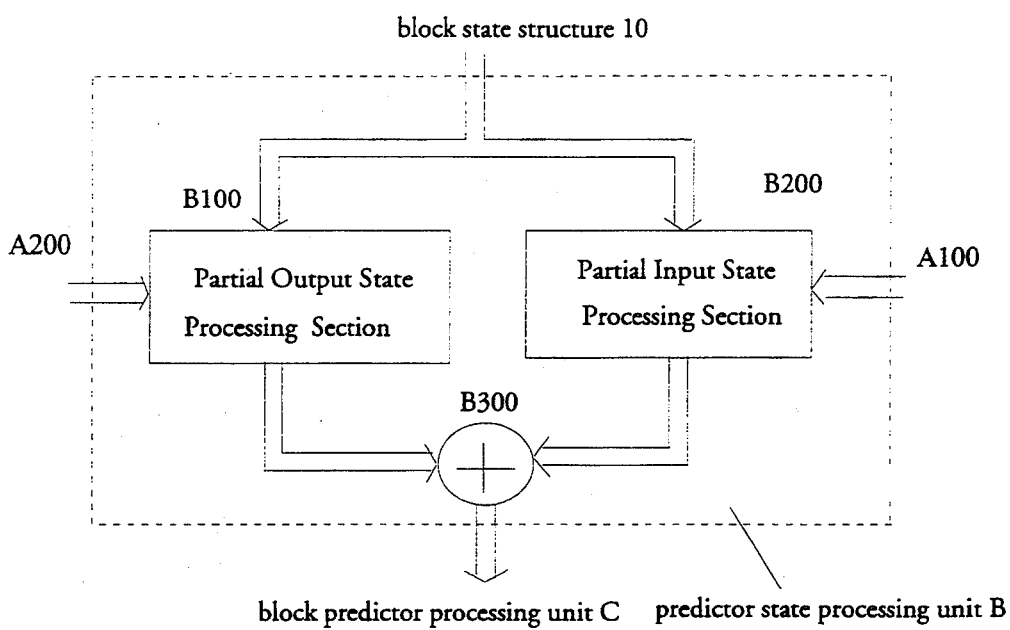
FIG. 8 is the diagram of the Block State Processing Unit.

FIG. 8 outlines the processes of the Block State Processing Unit B. Referring to the figure, the Block State Processing Unit contains the Partial Output State Processing Section B100 and the Partial Input State Processing Section B200. The Block State Processing Unit B determines the block state at time t as the sum of the Partial Input State and Partial Output State. The Block State is used in Block Predictor Processing Unit C. The detailed operations of the Block State Processing Unit are described below with reference to FIG. 9 to FIG. 14.

Figure 9:
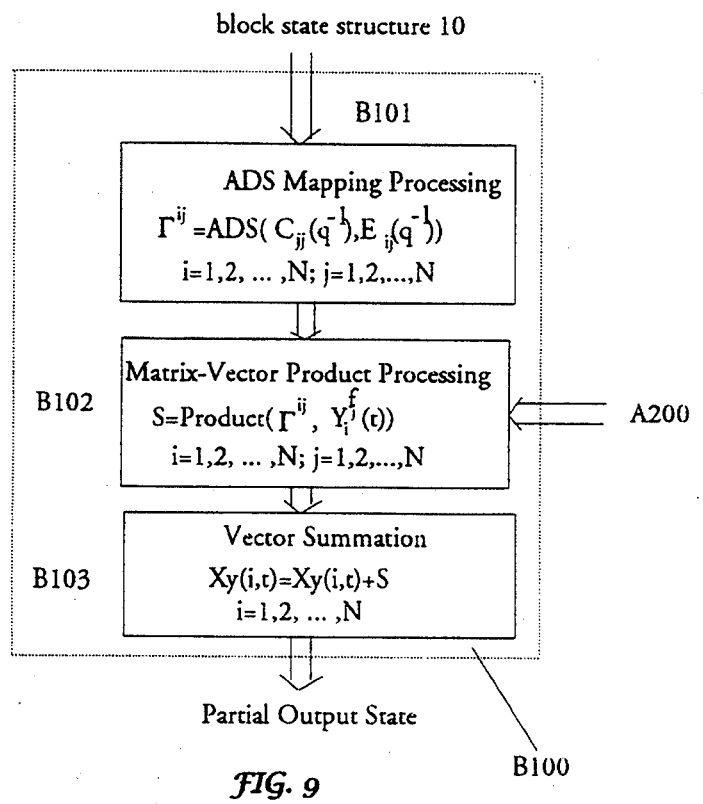
FIG. 9 is the flow chart of the Partial Output Block State Processing Section.

FIG. 9 is the flow chart for the method of computing the $(N \times n)$ 2-dimensional Partial Output State array $X_y(t) = (X_y(1,t), X_y(2,t), \ldots, X_y(N,t))^T$. Each vector $X_y(i,t)$ for $i=1,2,\ldots,N$ is of length n. Referring to the figure, the computation of the Partial Output State Xy(t) is accomplished as follows. For each i, the vector Xy(i,0) is first initialized at zero. The ADS Mapping Processing B101 then performs an anti-diagonal symmetric (ADS) mapping process for polynomials $C_{ij}(q^{-1})$ and $E_{ij}(q^{-1})$, in order to obtain the $n \times n$ anti-diagonal symmetric matrix $\Gamma^{ij}$. The detailed operations of the ADS Mapping Processing will be described below. Next, the Matrix-Vector Product B102 carries out the multiplication of matrix $\Gamma^{ij}$ with vector $Y_i^{fj}(t)$ and saves the resulting vector as S. Finally, the Vector Summation B103 performs the vector accumulated summation: $Xy(i,t) = Xy(i,0) + S$ for $j=1,2,\ldots,N$.

Figure 10:
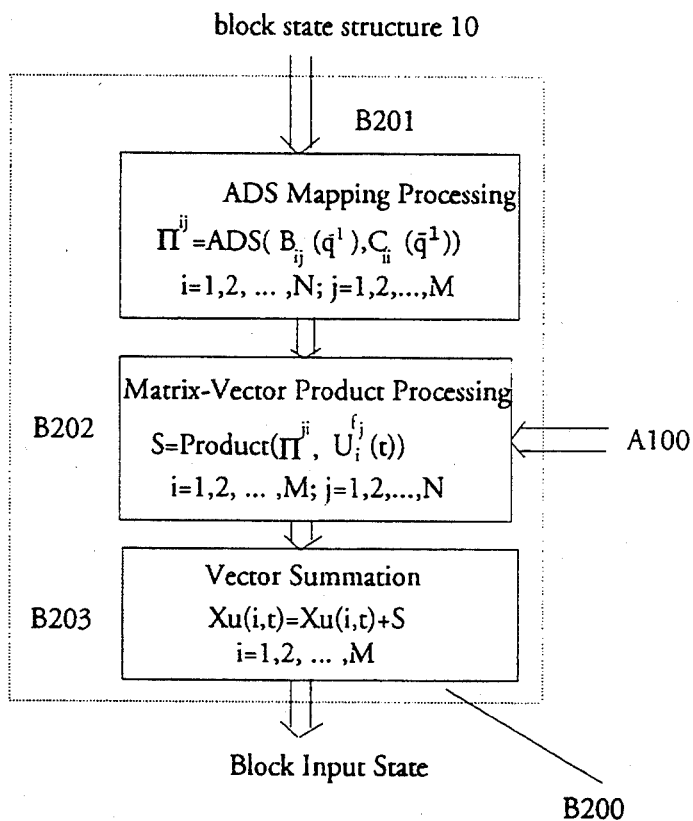
FIG. 10 is the flow chart of the Partial Input Block State Processing Section.

FIG. 10 is the flow chart for the method of computing the $(N \times n)$ 2-dimensional Partial Input State $X_u(t) = (X_u(1,t), X_u(2,t), \ldots, X_u(N,t))^T$ with each $X_u(i,t)$ being a vector of length n for $i=1,2,\ldots,N$. The procedures for the computation of the Partial Input State are analogous to those for the computation of the Partial Output State. Referring to the figure, the computation of the Partial Input State Xu(t) is accomplished as follows: for each i, the vector Xu(i,t) is first initialized at zero. The ADS Mapping B201 then performs an anti-diagonal symmetric mapping operation for polynomials $B_{ji}(q^{-1})$ and $C_{ii}(q^{-1})$, in order to obtain the $n \times n$ anti-diagonal symmetric array $II^{ij}$. Next, the Matrix-Vector Product B202 carries out the multiplication of matrix $II^{ij}$ with vector $U_i^{fj}(t)$ and saves the resulting vector as S. Finally, the Vector Summation B203 performs the vector accumulated summation: $Xu(i,t) = Xu(i,t) + S$ for $j=1,2,\ldots,M$.

Figure 11:
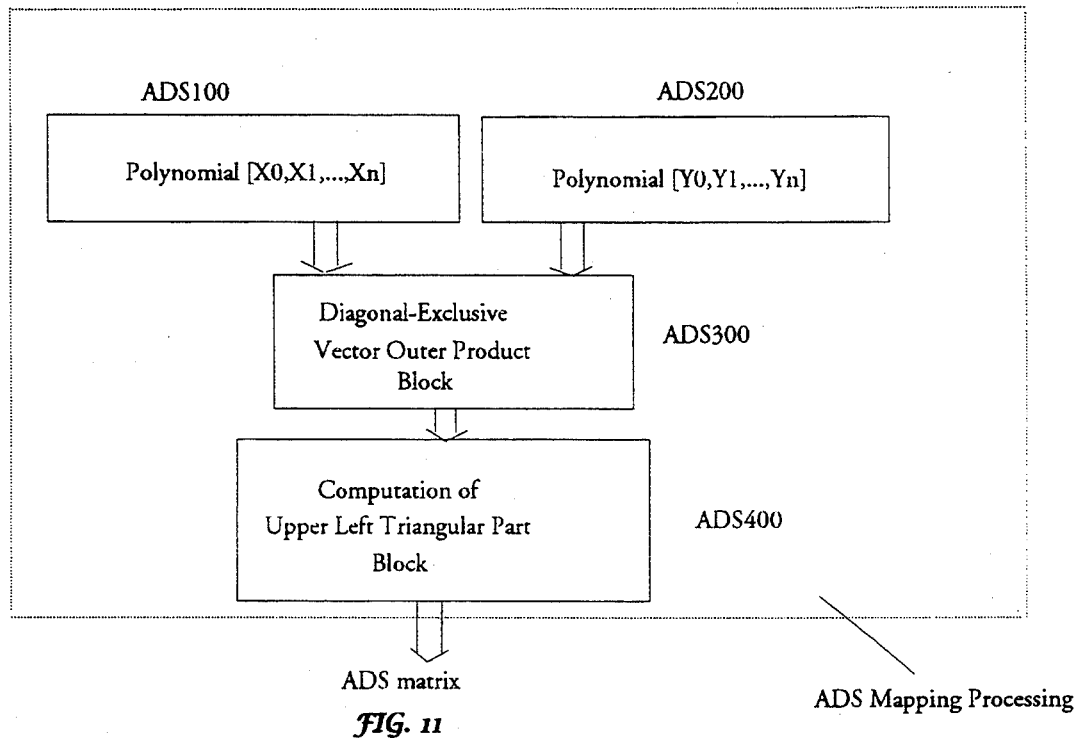
FIG. 11 is the flow chart of the ADS Mapping Processing.
Figure 12:
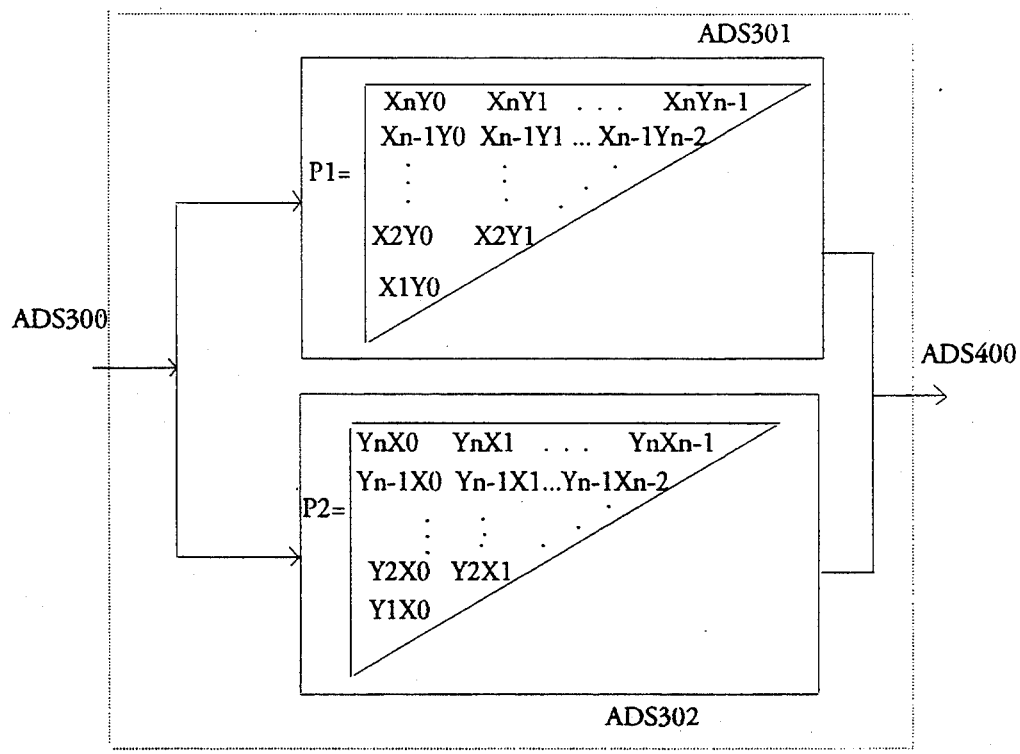
FIG. 12 is the diagram of the Diagonal-Exclusive Outer Product Processing.

FIG. 11 is the diagram of the detailed construction and operation of ADS mapping of two polynomials. Referring to the figure, Block ADS300 performs the diagonal-exclusive outer product on polynomials X of degree n in ADS100 and Y of degree n in ADS200. As shown in FIG. 12, the diagonal-exclusive out-product matrix resulting from the operations of ADS300 is divided into two upper left triangular matrices P1 as in ADS301 and P2 as in ADS302. Referring back to FIG. 11, ADS400 determines the upper left triangular part of the matrix in the following steps. First, P2 is subtracted P1. Second, P1 is updated according to: P1(i+j+1,j+1)←P1(i+j+1,j+1) +P1(i,0) for j≦(n-i-2)/2 and i=1,2, . . . ,n. Finally, elements in the lower left triangular part of P1 are assigned with values determined as the followings: P1(i+j,j+1)←P(i,j) for j>(n-i-2)/2 for i=1,2, . . . ,n. The updated P1 resulting from the three steps gives the ADS matrix of polynomials x and y. Note that the elements in the lower anti-diagonal part need not be computed because P1 is an anti-diagonal symmetric matrix.

Figure 13:
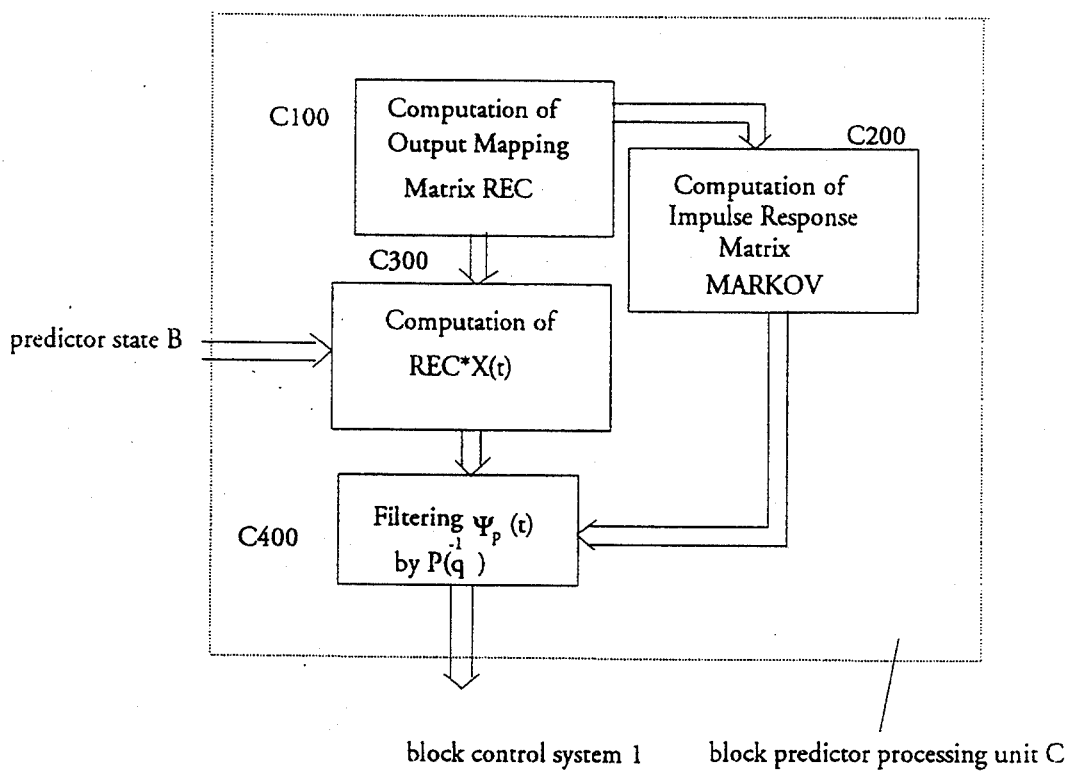
FIG. 13 is the diagram of the Block Predictor Processing Unit.

FIG. 13 is the block diagram of the Block Predictor Processing unit which computes the block predictor $\Psi_p(t)$ recursively in the prediction horizon. Since the block state X(t) is invariant with the horizon k and since the block of future controls is assumed to be known in advance, the recursive computation of the $\Psi_p(t)$ amounts to the recursive computation of the Impulse Response Matrix MARKOV and the Block State Mapping Matrix REC. C100 first constructs N vectors $H_1^i$ of dimension 1 by Nn for i=1,2, . . . ,N obtained by concatenation of the $l^{th}$ rows of submatrices $REC_{il}$ to $REC_{iN}$ (in order). Here l runs from to k. When l increases from l to l+1, only n new values need to be computed for each vector $H_{l+1}^i$, for i=1,2, . . . ,N, because all submatrices in $\bar{E}(d^{-1})$ are dynamic shift Toeplitz matrices. The relationship between vector $H_l^i$ and $H_{l+1}^i$ can be described as:

$$H_{l+1}^i = H_l^i C_e \qquad (13.1)$$

where $C_e = \{C_e^{ij}\}$ for (i=1,2, . . . ,N; j=1,2, . . . ,N) with the submatrices $C_e^{ij}$ being n by n matrices defined as $$C_e^{ii} = \begin{pmatrix} 0 & \cdots & & -e_n^{ii} \\ 1 & & & -e_{n-1}^{ii} \\ & \cdot & & \cdot \\ & & \cdot & \cdot \\ 0 & & 1 & -e_1^{ii} \end{pmatrix} \qquad (13.2)$$

for i = j or else $$C_e^{ji} = \begin{pmatrix} 0 & \cdots & & -e_n^{ij} \\ 0 & & & -e_{n-1}^{ij} \\ & \cdot & & \cdot \\ & & \cdot & \cdot \\ 0 & \cdots & 0 & -e_1^{ij} \end{pmatrix} \qquad (13.3)$$

C200 computes the impulse response parameter $g_j^{if}$ for i=1,2, . . . ,N and j=1,2, . . . ,M via vectors $H_{l-1}^i$ as $$g_j^{if} = H_{l-1}^i V_j \qquad (13.4)$$

where $V_j$ and $B_j$ for j=1,2, . . . ,M are the Nn by 1 vectors:

$$V_j = B_j - \sum_{p=1}^{N} b_0^{pj} E_p \qquad (13.5)$$

$$B_j = (B_{1j}^{cT}, B_{2j}^{cT}, \ldots, B_{Nj}^{cT})^T \qquad (13.6)$$

Here $B_{ij}^c$ (for i=1,2, . . . ,N and j=1,2, . . . ,M) denotes the n by 1 vector that contains all of the coefficients of the polynomial $B_{ij}(q^{-1})$ except $b_0^{ij}$. Similarly $E_y^c$ (for i=1,2, . . . ,N and j=1,2, . . . ,N) denotes the n by 1 vector that contains all the coefficients of the polynomial $E_{ij}(q^{-1})$ except $e_0^{ij}$:

$$B_{ij}^c = (b_n^{ij}, b_{n-1}^{ij}, \ldots, b_1^{ij})^T \qquad (13.7)$$

$$E_{ij}^c = (e_n^{ij}, e_{n-1}^{ij}, \ldots, e_1^{ij})^T \qquad (13.8)$$

Thus, C300 determines l-step ahead predictor $\psi_p^i(t+l)$ for the $i^{th}$ output $y_i(t)$ for i=1,2, . . . ,N as $$\psi_p^i(t+l) = \sum_{j=1}^{M} \sum_{p=1}^{l} g_p^{ij} u_j(t+l-p) + H_l^i X(t) \qquad (13.9)$$

Equations (13.1), (13.4) and (13.9) provide a recursive-in-horizon method for the computation of block predictor $\Psi_p(t)$ for increasing horizon l, from 1 through k, with the initial conditions for $H_1^i$ for i=1,2, . . . ,N given by $$H_1^i = (REC_1^{1i}, REC_1^{2i}, \ldots, REC_1^{Ni}) \qquad (13.10)$$

with $REC_1^{if} = (0,0, \ldots 1)$ if i=j and otherwise $REC_1^{if} = (0,0, \ldots 0)$.

Finally, C400 performs filtering operation on $\Psi_p(t)$ to obtain the block predictor $Z_p(t)$.

Figure 14:
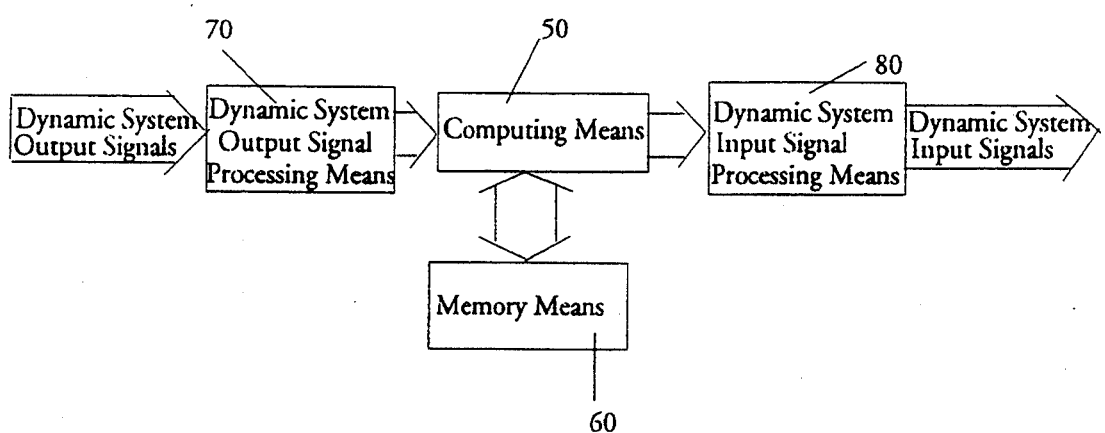
FIG. 14 is the description of computation engines for the Adaptive Block Predictive Controller.

FIG. 14 is the description of the computational engine which is used in conjunction with the extended horizon adaptive block predictive controller and efficient predictor system. The computational engine is comprised of computing means 50 and memory means 60.

When required due to the nature of the dynamic system input or output signals, dynamic system signal output processing means 70 and dynamic system signal input processing means 80 may also be included in the computational engine. Analytical computational resources for the computational engine are provided by the computing means 50, which is composed of various registers; accumulators; and timing, synchronization, instruction and address decoding circuitry. The memory means 60 may comprise either or both nonvolatile and volatile memory storage. In the prefered embodiment, non-volatile memory storage is used to contain both low level operating system information and high level application software, and volatile memory is used to store data and other temporary intermediate information. The computing means 50 executes operational code which is stored in both memory types.

When required by the type of dynamic system input and output signals, the dynamic system output signal processing means 70 may contain digital data buffers, digital level shifters, digital and/or analog communications interface circuitry, analog to digital conversion, analog signal conditioning and protection circuitry. The dynamic system output signal processing means 70 is used to convert real time dynamic system output signals to a form compatible with the computing means 50. The dynamic system input signal processing means 80 may also contain digital data buffers, digital level shifters, digital and/or analog communications interface circuitry, digital to analog signal conditioning and protection circuitry. This allows the dynamic system input signal processing means 80 to provide either digital or analog inputs to the dynamic system.

There are many computational engines which can work in conjunction with the extended horizon adaptive block predictive controller with efficient prediction system. These include 1) microcontrollers and 2) microprocessors with different memory adaptations. New products come out frequently which improve computational speed, improve memory size or speed, add peripheral features, and/or lower cost. Due to the wide variety of computational engines, computing means and memory means which are currently available and rapidly becoming available, each application may have different requirements which will call for a different computational engine configuration. Conversely, old computational engines, and their computing means and memory means, are rapidly becoming obsolete.

Figure 15:
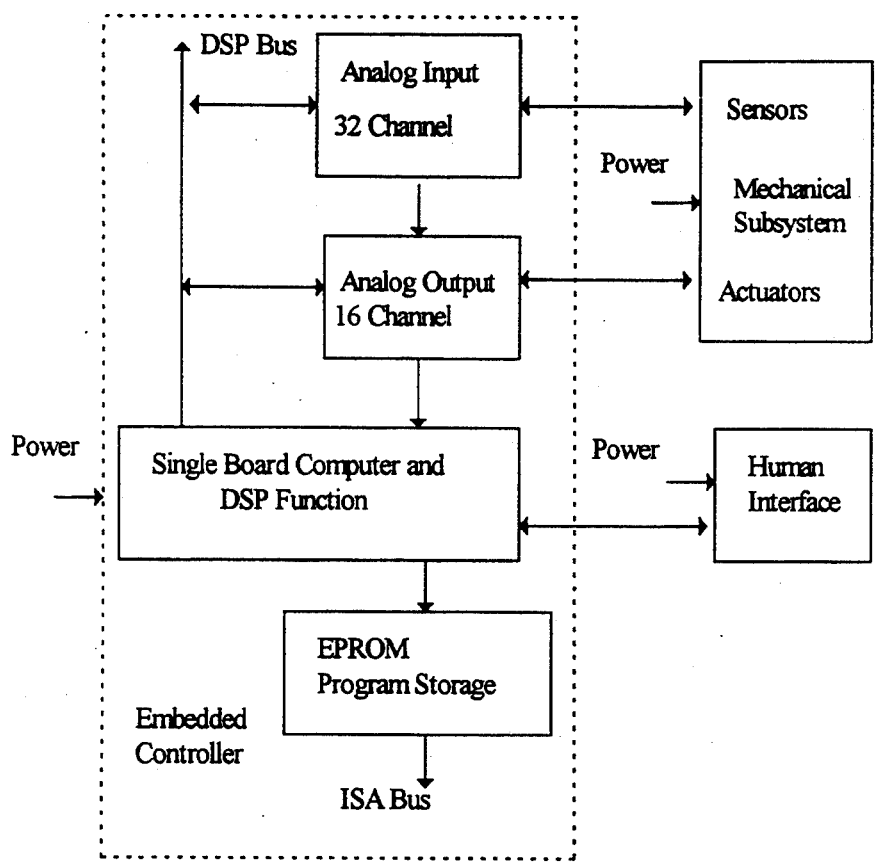
FIG. 15 Embedded Controller Block Diagram

FIG. 15 shows the preferred embodiment of the Embedded Controller. The Embedded Controller is comprised of a Single Board Computer and Digital Signal Processing (DSP) Function Card, Electrically Programmable Read Only Memory (EPROM) Card, Analog Input Card and Analog Output Card. Analytical computational resources for the Embedded Controller are provided by the Single Board Computer and Digital Signal Processing Function Card which is composed of various registers, accumulators, and timing, synchronization, instruction and address decoding circuitry. The memory portion of the Embedded Controller consists of both non-volatile and volatile memory types. Non-volatile memory storage contained on the EPROM Card is used to contain both low level operating system information and high level application software. While volatile memory contained on the Single Board Computer and Digital Signal Processing Function Card is used to store data and other temporary intermediate information. The Single Board Computer and Digital Signal Processing Function Card executes operational code which is stored in both memory types. The Analog Input Signal Processing component of the Embedded Controller contains digital data buffers, analog to digital conversion, analog signal conditioning and protection circuitry. It is used to convert real time control input signals to a form compatible with the Single Board Computer and Digital Signal Processing Function Card. The Analog Output Signal Processor also has digital data buffers, analog signal conditioning and protection circuitry. However, the Analog Output Signal Processor's primary function is digital to analog conversion which makes the digital output of the Single Board Computer and Digital Signal Processing Function Card compatible with the real time actuators of the control system. If required, both the Input and Output Signal Processors can condition and function with direct digital information.

Figure 16:
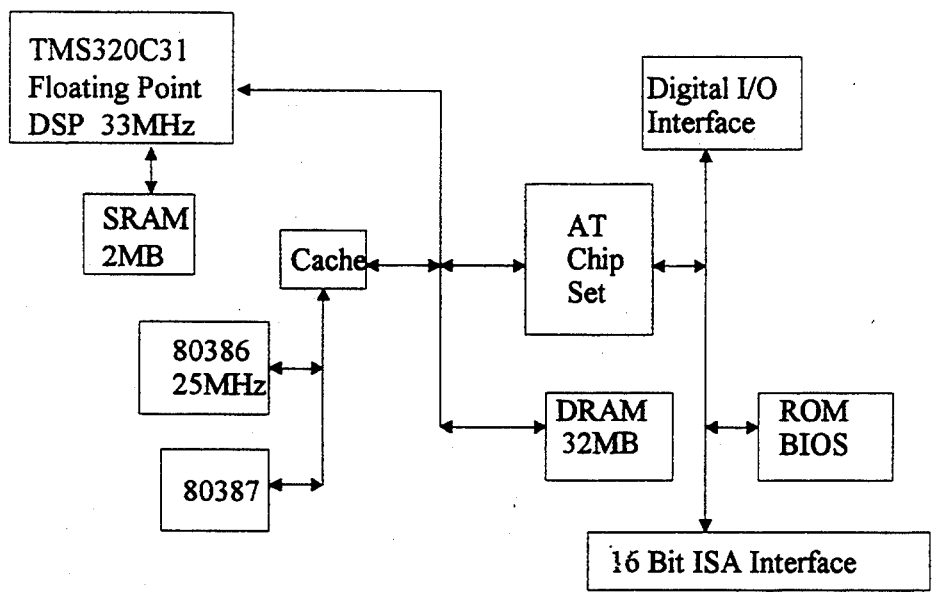
FIG. 16 Single Board Computer and DSP Function Block Diagram.

FIG. 16 is the Single Board Computer and Digital Signal Processing Function Card Block Diagram. The salient feature of the preferred embodiment Embedded Controller is the very highly integrated Single Board Computer and Digital Signal Processing Function Card manufactured by Spectrum Signal Processing Inc. The Single Board Computer and Digital Signal Processing Function Card integrates all of the logic functions from the original IBM AT mother board while including other enhancements such as DSP functions. This highly integrated card facilitates the substantial reduction in controller size, weight, power consumption, and cost. The core of the Single Board Computer and Digital Signal Processing Function Card is a Intel 80386 microprocessor with a full 32 bit instruction set, registers, internal memory organization, all addressing modes, real and protected environment modes, interrupt priorities, and halt and shut down cycles. An external Intel 80387 math coprocessor is used to enhance the floating point execution times. A Texas Instrument TMS320C31 DSP chip is also include, d on the Single Board Computer and Digital Signal Processing Function Card. Said DSP chip features 32 bit instruction and data words, 24 address lines, and 40 bit floating point operations. Said DSp chip also includes on chip peripherals such as a Direct Memory Access (DMA) controller, instruction cache, serial port, two 32 bit timers, two general purpose external flags and four external interrupts. These features provide up to 33 million floating point operations per second (MFLOPS) of DSP performance. Internal memory management functions on the Single Board Computer and Digital Signal Processing Function Card facilitate direct connection to memory to the Intel 80386. An internal DRAM control unit provides direct memory interface of up to 32MB of physical memory. A shadow RAM control feature and a ROM chip select function provides direct interface to a Built In Operating System (BIOS) EPROM. The general AT Core Peripherals such as: an interrupt unit which accepts requests from peripherals and resolves priority levels, a Counter/Timer that provides binary or BCD counting functions, and a Real Time Clock which combines a complete time of day clock with alarm and calendar functions are all included on the Single Board Computer and Digital Signal Processing Function Card. Control inputs and outputs are interfaced to the Single Board Computer and Digital Signal Processing Function Card using a high speed DSP-Link Bus and use the AT ISA Bus only for power. Control inputs are processed using a AT half size Analog Input Card. The card contains analog signal conditioning, analog to digital converters, digital signal input buffers, and analog and digital input signal protection circuitry. It is used to convert real time control input signals to a form compatible with the DSP-Link Bus. The control outputs are processed using a AT half size Analog Output Card. It contains digital to analog converts, analog power amplifiers, digital line drives, special actuator drive circuits, and output protection circuitry. It is used to convert the DSP-Link Bus digital data into analog output signals required for the real time control of the actuators of the control system.

Other Embedded Controllers can be based on the computing means which use the Intel 80486, Intel Pentium, Intel i960, R3000, R4000, R6000, Motorola 68HC16, and many others which are familiar to those skilled in the art of computing means.

Figure 17:
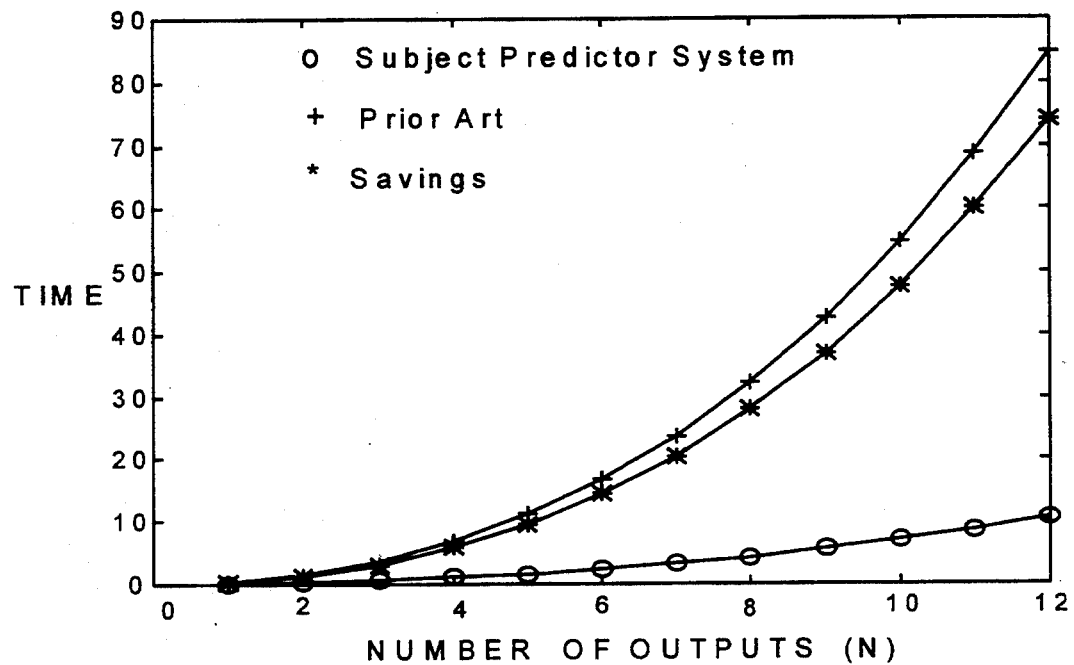
FIG. 17 is a plot of run time savings versus the number of system outputs.

FIG. 17 is a plot of the run time savings the subject predictor system over the Diophantine equation method, as the number of outputs varies. The measured run time for each prediction method (and the difference between them) is shown. The dynamic system has 15 inputs and a model parameter order of 10. The number of outputs is allowed to vary from 1 to 12. Both predictor systems compute predicted outputs for each horizon from k=1 to k=20. The run time savings of the subject prediction system increases cubically with N. As demonstrated in this trial, a dramatic savings in computation time is obtained using the subject predictor system, for large values of N. Thus for dynamic systems having a large number of outputs, significant computational efficiencies are obtainable using the subject predictor system for extended horizon adaptive predictive control.

Figure 18:
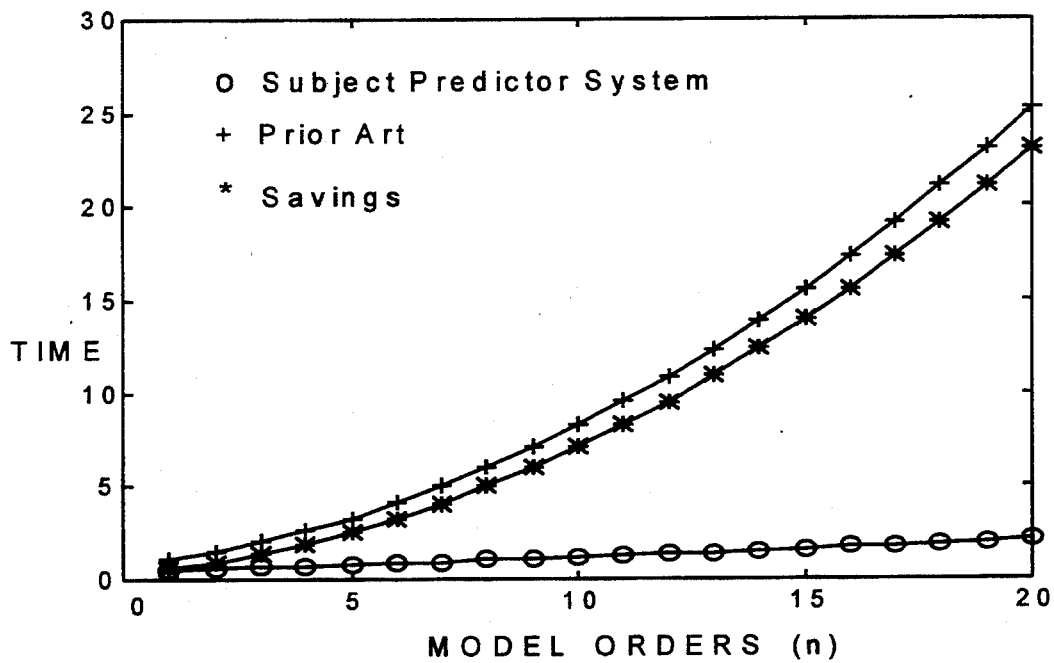
FIG. 18 is a plot of run time savings versus the model parameter order.

FIG. 18 is a plot of the the run time savings obtained by the use of the subject predictor system, relative to the Diophantine equation method, as the model parameter order n varies. The measured run time for each prediction method (and the difference between them) is shown. Here the dynamic system has 5 inputs and 5 outputs. Both predictor systems perform the task of computing predicted outputs, for each horizon from $k=1$ to $k=30$. The model parameter order n varies from $n=1$ to $n=20$. The run time savings of the subject prediction system increases quadratically with the model parameter order n. Thus for dynamic systems having a large model parameter order n, significant computational efficiencies are obtainable using the subject predictor system for extended horizon adaptive predictive control.

Figure 19:
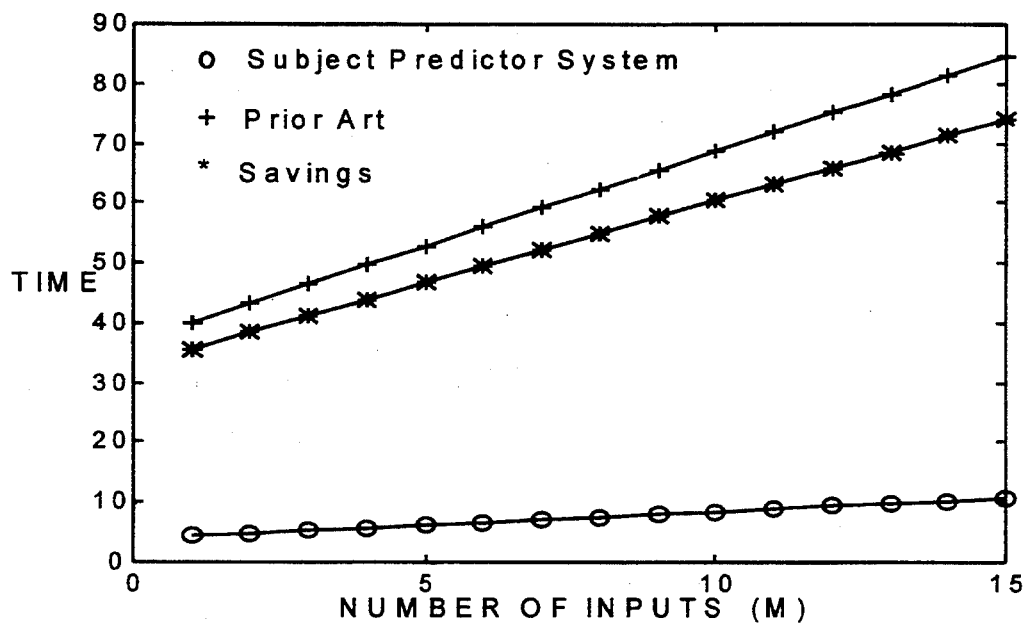
FIG. 19 is a plot of run time savings versus the number of system inputs.

FIG. 19 is a plot of the the run time savings obtained by the subject predictor system, relative to the Diophantine equation method, as number of inputs varies. The measured run time for each prediction method (and the difference between, them) is shown. The dynamic system has 12 outputs and a model parameter order of 10. The number of inputs is varied from 1 to 15. Both predictor systems perform the same task of computing predicted outputs, for each horizon from $k=1$ to $k=20$. The run time savings of the subject prediction system increases linearly with M.

Figure 20:
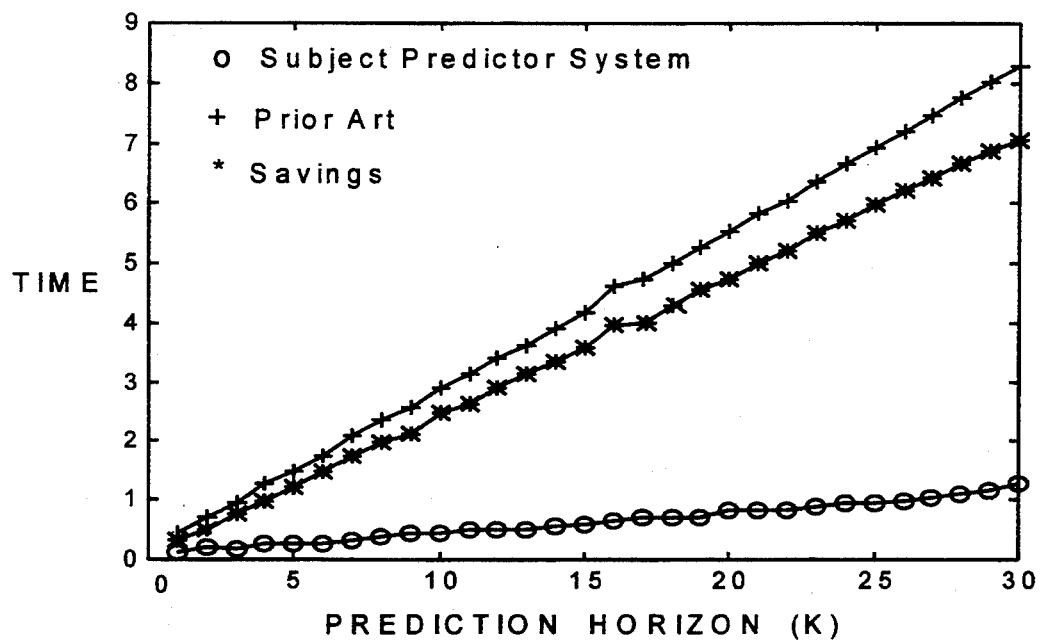
FIG. 20 a plot of run time savings versus the prediction horizon of the controller.

FIG. 20 is a plot of the run time savings obtained by the subject predictor system, relative to the Diophantine equation method, as the horizon k varies. The dynamic system in this example has 5 inputs and 5 outputs, and a model parameter order of 10. Both predictor systems perform the same task of computing predicted outputs for each horizon, as k is varied from 1 to 30. The run time savings of the subject prediction system increases linearly with prediction horizon k.

To further demonstrate the computational efficacy of the predictor system, we embedded the subject system in a controller testbed which uses a 80286 microprocessor and a 80287 math coprocessor. The system considered has two inputs and two outputs with a model order of 2. Here, it is assumed that the system auto-regression dynamic and predictor filter matrices are all diagonal. For this system, a typical execution time on the controller testbed with the subject predictor system is 0.057 seconds.

There are numerous applications of extended horizon adaptive block predictive controller with an efficient prediction system in the control of dynamic systems. One system requiring low cost components is the control of the automobiles. The extended horizon adaptive block predictive controller with an efficient prediction system ,can be used to control acceleration, braking and steering of automobiles operating in close proximity to one another at high speed on highways as well as maintenance of the distances between moving vehicles. It can also be used in active suspension systems to smooth out the ride on automobiles or for controlling the suspension systems on magnetically levitated vehicles. It can also be used for engine and transmission control, including control of fuel emissions, engine power, speed, and response of the vehicle to driver .commands. The same applications apply to gasoline, fossil, and electrically powered trucks, transport vehicles, buses and utility vehicles. This includes systems using rail, track and wheels. Other vehicular applications include control of ships, including engine, sail configuration, stabilizer, and hydrofoil control.

The speeds and feeds of milling, grinding and cutting machines which process complex parts, particularly those with non homogeneous compositions, can be more effectively controlled with the extended horizon adaptive block predictive controller with an efficient prediction system. Part accuracy can be increased and power consumption can be decreased. This includes fabric cutting.

A major application of the subject invention is the control of aircraft, including active control of flight control surfaces, engines and other ancillary systems.

Multi-stage steam turbines and jet engine turbines which have inter-stage extractions can have their performance improved with the subject invention. Missiles can be more efficiently targeted and spacecraft pointing and docking accuracy can also be improved with the subject invention. The invention is also particularly useful for robot hand/eye coordination. These are but a few examples of the applications of the subject invention to real time control of dynamic systems. The invention can also be used for simulations of such systems.

Having described our invention we therefore claim:

1. A control method including system output prediction in an apparatus effecting control over a multivariable dynamic system approximated as a linear system having N output signals, M input signals, and model parameter order n where N, M, and n are finite positive :integers, the control method comprising:

receiving variables including at least one of a set of dynamic system parameters and a set of system outputs y(t) from said multivariable dynamic system;

generating a block of k filtered output z(t) predictions of said multivariable dynamic system by:

selectively filtering the set of system outputs v(t);

constructing a block state structure from the variables of said multivariable dynamic system;

using the block state structure, generating at least one of a block of k output y(t) predictions when the filtering of said set of system outputs y(t) is not performed and a block of k filtered output $\psi(t)$ predictions when the selective filtering of said set of system outputs y(t) is performed, each of dimension N consisting of output y(t) predictions and filtered output $\psi(t)$ predictions respectively at each future time step up to a prediction horizon k; and, using i) the-block of k output predictions when the selective filtering of said set of system outputs y(t) is not performed and ii) the block of k filtered output $\psi(t)$ predictions when the selective filtering of said set of system outputs y(t) is performed, to generate said block of k filtered output z(t) predictions;

combining said block of k filtered output z(t) predictions with a desired output trajectory to generate block control signals; and, outputting said block control signals as input signals to said multivariable dynamic system to effect said control over the system.

2. The control method according to claim 1, further comprising the step of removing output measurement noise by sequentially filtering the system input and output signals.

3. The control method according to claim 1, further comprising the step of minimizing an objective function by sequentially filtering the system input and output signals.

4. The control method according to claim 1 wherein the step of generating at least one of a block of k output y(t) predictions and a block of k filtered output $\psi(t)$ predictions using the block state structure comprises the step of representing the block of k output y(t) predictions and the block of k filtered output $\psi(t)$ predictions using a block state of dimension N by n, which is independent of the prediction horizon k.

5. The control method according to claim 4 wherein the block state constructing step includes summation of a partial input state and a partial output state of said multivariable dynamic system.

6. The control method according to claim 5, further comprising obtaining a partial output state utilizing $N^2$ anti-diagonal symmetric matrices each of dimension n by n, in conjunction with the multivariable dynamic system output data.

7. The control method according to claim 5, further comprising obtaining the partial input state utilizing N by M anti-diagonal symmetric matrices each of dimension n by n, in conjunction with the multivariable dynamic system input data.

8. The control method according to claim 4 wherein the step of generating at least one of a block of k output y(t) predictions and a block of k filtered output $\psi(t)$ predictions using the block state structure includes the use of dynamic shift Toeplitz matrices.

9. The control method according to claim 1, wherein the block of k output y(t) predictions or k filtered output $\psi(t)$ predictions is obtained as the sum of product of the block state structure with a block state mapping matrix extracted from the inverse of the lowest order coefficient matrix of an auto-regressive polynomial matrix of a block input output representation of the multivariable dynamic system and product of a block of future k inputs, each of dimension M, with an impulse response matrix.

10. The control method according to claim 9 wherein a step of obtaining a predictor output mapping matrix comprises the use of dynamic shift Toeplitz matrices.

11. The control method according to claim 1, wherein:
said at least one of a block of k output y(t) predictions and k filtered output $\psi(t)$ predictions is obtained as the product of the block state structure and a block state mapping matrix obtained from the first k terms of the inverse of an auto-regressive polynomial matrix of an input/output representation of the multivariable dynamic system.

12. The control method according to claim 1, wherein a computation of at least one of a block of k output predictions and a block of k filtered $\psi(t)$ predictions is performed recursively for increasing horizons from 1 through k.

13. The control method according to claim 12, further comprising using a dynamic shift Toeplitz formulation to recursively compute rows of a block state mapping matrix.

14. The control method according to claim 12, further comprising using system identification methods which provide estimated parameters of the multivariable dynamic system based on measurements of input and output signals.

15. The control method according to claim 1 wherein the step of using said k filtered output $\psi(t)$ predictions to generate said k filtered output z(t) predictions includes filtering said k filtered output $\psi(t)$ predictions to generate k filtered output z(t) predictions.

16. The control method according to claim 15 further comprising estimating parameters of the multivariable dynamic system based on measurements of input and output signals combined with system identification methods.

17. The control method according to claim 15 wherein each of the steps are performed in real time.

18. The control method according to claim 1 further comprising using the block of output y(t) predictions or filtered output z(t) predictions, in combination with blocks of inputs, outputs and desired outputs to determine a feedback control of a multivariable dynamic system.

19. The control method according to claim 16 wherein each of the steps are performed in real time.

20. The control method according to claim 1 wherein the steps of at least one of said steps of generating y(t) prediction and filtered output z(t) prediction is performed in real time.

21. A system controller, including system output prediction in an apparatus effecting control over a multivariable dynamic system approximated as a linear system having N output signals, M input signals, and model parameter order n where N, M, and n are finite positive integers comprising:
means adapted for receiving variables from an associated multivariable dynamic system, which variables include at least one of a set of dynamic system parameters and a set of system outputs
predictor means for generating output predictions of said multivariable dynamic system, the predictor means including:
selective filtering means for selectively filtering said set of system outputs y(t);
means for constructing a block state structure from the variables of said multivariable dynamic system;
generating means for generating at least one of a block of k output y(t) predictions when the filtering of said set of system outputs y(t) is not performed and a block of k filtered output $\psi(t)$ predictions when the selective filtering of said set of system outputs y(t) is performed in accordance with the block state structure, each of dimension N consisting of output y(t) predictions and filtered output $\psi(t)$ predictions respectively at each future time step up to a prediction horizon k, and
the generating means including means for generating a block of k filtered output z(t) predictions using i) the block of k output y(t) predictions when the selective filtering of said set of system outputs y(t) is not performed and ii) the block of k filtered output $\psi(t)$ predictions when the selective filtering of said set of system outputs y(t) is performed;
combining means for combining said block of k filtered output z(t) predictions with a desired output trajectory to generate block control signals; and
output means for outputting said block control signals as input signals to said multivariable dynamic system to effect said control over the system.

22. The system controller of claim 21 further comprising a filter means for filtering output measurement noise by sequentially filtering the system input and output signals.

23. The control system of claim 22 wherein the predictor means includes means for minimizing an objective function by sequentially filtering the system input and output signals.

24. A block predictive controller for control and prediction of an associated multivariable dynamic system approximated as a linear system having N dynamic output signals, M dynamic input signals, and model parameter order n where N, M, and n are finite positive integers, the controller receiving a block of dynamic system outputs and generating a block of dynamic system inputs to effect said control, the controller comprising:
   a block predictor system means adapted for receiving measurements of said dynamic system outputs, the block predictor system means including means for combining said measurements with dynamic system parameters to generate a block of predicted filtered system outputs;
   a block control system means for determining a block of potential system inputs based upon a block of desired output trajectory and said block of predicted filtered system outputs; and,
   a control implementation unit receiving said block of potential system inputs and generating said block of dynamic system inputs according to a predetermined control algorithm to control said multivariable dynamic system.

25. The block predictive controller according to claim 24 wherein said block predictor system means includes means for generating a block of filtered output z(t) predictions of said multivariable dynamic system as said block of predicted filtered system outputs by:
   constructing a block state structure from said dynamic system parameters;
   using the block state structure, generating a block of k filtered output $\psi(t)$ predictions of dimension consisting of filtered output $\psi(t)$ predictions at each future time step up to a prediction horizon k; and,
   using said block of k filtered output predictions, generating said block of k filtered output z(t) predictions.

26. An adaptive block predictive controller for control and prediction of an associated multivariable dynamic system approximated as a linear system having N dynamic output signals, M dynamic input signals, and model parameter order n where N, M, and n are finite positive integers, the controller receiving a block of dynamic system outputs and generating a block of dynamic system inputs to effect said control, the controller comprising:
   identifier means for identifying parameters of said multivariable dynamic system and generating a block of identified parameters;
   a block predictor system means adapted for receiving measurements of said dynamic system outputs, the block predictor system means including means for combining said measurements with a one of dynamic system parameters from said multivariable dynamic system and said block of identified parameters to generate a block of predicted filtered system outputs;
   a block control system means for determining a block of potential system inputs based upon a block of desired output trajectory and said block of predicted filtered system outputs; and,
   a control implementation unit receiving said block of potential system inputs and generating said block of dynamic system inputs according to a predetermined control algorithm to control said multivariable dynamic system.

27. The adaptive block predictive controller according to claim 26 wherein said a block predictor system means includes means for generating a block of filtered output z predictions of said multivariable dynamic system as said block of predicted filtered system outputs by:
   constructing a block state structure from said dynamic system parameters and said block of identified parameters;
   using the block state structure, generating a block of k filtered output $\psi(t)$ predictions of dimension N consisting of filtered output $\psi(t)$ predictions at each future time step up to a prediction horizon k; and,
   using a block of k filtered output $\psi(t)$ predictions, generating a block of k filtered output z(t) predictions.

28. A system output prediction method in an apparatus for predicting at least one of the filtered outputs z(t) of a multivariable dynamic system approximated as a linear system having N output signals, M input signals, and model parameter order n where N, M, and n are finite positive integers, the control method comprising:
   receiving variables including a set of dynamic system parameters and a set of system outputs from said multivariable dynamic system;
   generating a block of k filtered output z(t) predictions of said multivariable dynamic system by:
      constructing a block state structure from the variables of said multivariable dynamic system;
      using the block state structure, generating a block of k filtered output $\psi(t)$ predictions of dimension N consisting of filtered output $\psi(t)$ predictions at each future time step up to a prediction horizon k; and,
   using a block of k filtered output $\psi(t)$ predictions, generating said block of k filtered output z(t) predictions.

29. A control method including system output prediction in an apparatus effecting control over a multivariable dynamic system approximated as a linear system having N output signals, M input signals, and model parameter order n where N, M, and n are finite positive integers, the control method comprising:
   receiving variables including at least one of a set of dynamic system parameters and a set of system outputs y(t) from said multivariable dynamic system;
   generating a block of k filtered output z(t) predictions of said multivariable dynamic system by:
      constructing a block state structure from the variables of said multivariable dynamic system;
      using the block state structure, generating a block of k output y(t) predictions of dimension N consisting of output y(t) predictions at each future time step up to a prediction horizon k; and,
      filtering the block of k output y(t) predictions to generate said block of k filtered output z(t) predictions;
   combining said block of k filtered output z(t) predictions with a desired output trajectory to generate block control signals; and, outputting said block control signals as input signals to said multivariable dynamic system to effect said control over the system.

30. A control method including system output prediction in an apparatus effecting control over a multivariable dynamic system approximated as a linear system having N output signals, M input signals, and model parameter order n where N, M, and n are finite positive integers, the control method comprising:
  receiving variables including at least one of a set of dynamic system parameters and a set of system outputs y(t) from said multivariable dynamic system;
  generating a block of k filtered output z(t) predictions of said multivariable dynamic system by:
    filtering the set of system outputs y(t);
    constructing a block state structure from the variables of said multivariable dynamic system;
    using the block state structure, generating a block of k filtered output $\psi(t)$ predictions of dimension N consisting of filtered output $\psi(t)$ predictions at each future time step up to a prediction horizon k; and,
    filtering the block of k filtered output $\psi(t)$ predictions to generate said block of k filtered output z(t) predictions;
  combining said block of k filtered output z(t) predictions with a desired output trajectory to generate block control signals; and,
  outputting said block control signals as input signals to said multivariable dynamic system to effect said control over the system.

31. A control method including system output prediction in an apparatus effecting control over a multivariable dynamic system approximated as a linear system having N output signals, M input signals, and model parameter order n where N, M, and n are finite positive integers, the control method comprising:
  receiving variables including at least one of a set of dynamic system parameters and a set of system outputs y(t) from said multivariable dynamic system;
  generating a block of k filtered output z(t) predictions of said multivariable dynamic system by:
    filtering the set of system out,puts y(t) using a first set of filtering polynomials;
    constructing a block state structure from the variables of said multivariable dynamic system, the variables including the filtered set of system outputs y(t);
    using the block state structure, generating a block of k filtered output $\psi(t)$ predictions of dimension N consisting of filtered output $\psi(t)$ predictions at each future time step up to a prediction horizon k; and,
    filtering the block of k filtered output $\psi(t)$ predictions to generate said block of k filtered output z(t) predictions;
  combining said block of k filtered output z(t) predictions with a desired output trajectory to generate block control signals; and,
  outputting said block control signals as input signals to said multivariable dynamic system to effect said control over the system.

32. The control method according to claim 31 wherein the step of filtering the set of system outputs y(t) includes filtering the set of system outputs y(t) using an identity matrix.

33. The control method according to claim 31 wherein the step of filtering the set of system outputs y(t) includes filtering the set of system outputs y(t) using a first filtering matrix other than an identity matrix.

34. A system controller, including system output prediction in an apparatus effecting control over a multivariable dynamic system approximated as a linear system having N output signals, M input signals, and model parameter order n whence N, M, and n are finite positive integers comprising:
  means adapted for receiving variables from an associated multivariable dynamic system, which variables include at least one of a set of dynamic system parameters and a set of system outputs y(t);
  predictor means for generating output predictions of said multivariable dynamic system, the predictor means including:
    means for constructing a block state structure from the variables of said multivariable dynamic system;
    generating means for generating a block of k filtered output $\psi(t)$ predictions in accordance with the block state structure, the block of k filtered output $\psi(t)$ predictions being of dimension N and comprising filtered output $\psi(t)$ predictions at each future time step up to a prediction horizon k, and
    the generating means including means for generating a block of k filtered output z(t) predictions using the block of k filtered output $\psi(t)$ predictions;
  combining means for combining said block of k filtered output z(t) predictions with a desired output trajectory to generate block control signals; and,
  output means for outputting said block control signals as input signals to said multivariable dynamic system to effect said control over the system.

* * * * *